United States Patent
Yoon et al.

(10) Patent No.: US 10,921,820 B2
(45) Date of Patent: Feb. 16, 2021

(54) MOVABLE OBJECT AND CONTROL METHOD THEREOF

(71) Applicant: Samsung Electronics Co., Ltd., Suwon-si (KR)

(72) Inventors: Suk June Yoon, Seoul (KR); No San Kwak, Suwon-si (KR); Kyung Shik Roh, Seongnam-si (KR); Soon Yong Park, Bucheon-si (KR); Sung Hwan Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 15/838,778

(22) Filed: Dec. 12, 2017

(65) Prior Publication Data

US 2018/0173244 A1   Jun. 21, 2018

(30) Foreign Application Priority Data

Dec. 19, 2016   (KR) .................. 10-2016-0173535

(51) Int. Cl.
*G05D 1/02*   (2020.01)
*G06N 3/04*   (2006.01)
(Continued)

(52) U.S. Cl.
CPC ........ *G05D 1/0274* (2013.01); *A47L 11/4011* (2013.01); *G01C 21/00* (2013.01);
(Continued)

(58) Field of Classification Search
CPC .. G05D 1/0274; G05D 1/0246; G05D 1/0221; G05D 2201/0203; G05D 1/0278; G05D 1/0285; G05D 1/0251; G05D 1/027; G01C 21/206; G01C 21/00; G01C 21/005; H04W 4/33; H04W 4/70; G01S 5/16;
(Continued)

(56) References Cited

U.S. PATENT DOCUMENTS 8,687,048 B2 * 4/2014 Morifuji ............ H04N 5/23238
                                                                          348/50
9,551,781 B2 * 1/2017 Baxley .................. G01S 5/0242
(Continued)

FOREIGN PATENT DOCUMENTS

| KR | 10-2007-0026912 A | 3/2007 | |
|---|---|---|---|
| KR | 20070026912 A * | 3/2007 | ........... G05D 1/0246 |
| KR | 10-2014-0030854 A | 3/2014 | |

OTHER PUBLICATIONS

Piotr Mirowski et al., "Depth Camera SLAM on a Low-cost WiFi Mapping Robot" 2012 IEEE International Conference on Technologies for Practical Robot Applications (TePRA) Date of Conference: Apr. 23-24, 2012 , pp. 1-6.*
(Continued)

*Primary Examiner* — Nicholas Kiswanto

(57) ABSTRACT

Disclosed herein are a movable object and a movable object control method. The movable object control method may include acquiring an image of a movable object's surroundings, acquiring a signal having strength changing depending on a location of the movable object, generating a map on the basis of the signal and the image of the surroundings of the movable object, and applying the map to an algorithm to acquire a learned algorithm.

15 Claims, 26 Drawing Sheets

(51) Int. Cl.
*A47L 11/40* (2006.01)
*G01C 21/20* (2006.01)
*H04W 4/33* (2018.01)
*H04W 4/70* (2018.01)
*G01C 21/00* (2006.01)
*G01S 5/16* (2006.01)
*G01S 5/02* (2010.01)

(52) U.S. Cl.
CPC ......... *G01C 21/005* (2013.01); *G01C 21/206* (2013.01); *G01S 5/0257* (2013.01); *G01S 5/16* (2013.01); *G05D 1/027* (2013.01); *G05D 1/0221* (2013.01); *G05D 1/0246* (2013.01); *G05D 1/0251* (2013.01); *G05D 1/0285* (2013.01); *G06N 3/04* (2013.01); *H04W 4/33* (2018.02); *H04W 4/70* (2018.02); *A47L 2201/04* (2013.01); *G05D 2201/0203* (2013.01)

(58) Field of Classification Search
CPC ..... G01S 5/0257; G06N 3/04; A47L 2201/04; A47L 11/4011; G06T 7/73; G06T 2207/30252
See application file for complete search history.

(56) References Cited

U.S. PATENT DOCUMENTS

| | | | | |
|---|---|---|---|---|
| 9,584,969 | B2* | 2/2017 | Yiu | H04W 24/10 |
| 9,612,123 | B1* | 4/2017 | Levinson | B60W 30/09 |
| 9,642,167 | B1* | 5/2017 | Snyder | H04W 4/90 |
| 9,883,337 | B2* | 1/2018 | Sadr | H04W 4/026 |
| 9,930,252 | B2* | 3/2018 | Djugash | G06K 9/209 |
| 10,127,434 | B2* | 11/2018 | Rao | G06K 9/00664 |
| 10,168,709 | B2* | 1/2019 | Kleiner | A47L 9/0488 |
| 10,223,737 | B2* | 3/2019 | Srinivasan | G06Q 30/0639 |
| 10,265,859 | B2* | 4/2019 | Deyle | B25J 11/008 |
| 10,275,662 | B1* | 4/2019 | Askeland | H04N 5/247 |
| 10,373,116 | B2* | 8/2019 | Medina | G05D 1/106 |
| 10,429,839 | B2* | 10/2019 | Liu | B64C 39/024 |
| 10,520,943 | B2* | 12/2019 | Martirosyan | G06T 7/292 |
| 2005/0137786 | A1* | 6/2005 | Breed | B60N 2/2863 701/482 |
| 2007/0018890 | A1* | 1/2007 | Kulyukin | G01C 21/005 342/357.31 |
| 2011/0199373 | A1* | 8/2011 | Liu | G02B 30/54 345/419 |
| 2013/0216098 | A1* | 8/2013 | Hasegawa | G06T 7/246 382/103 |
| 2014/0320661 | A1* | 10/2014 | Sankar | H04N 5/23293 348/158 |
| 2015/0197010 | A1 | 7/2015 | Ruuspakka et al. | |
| 2016/0059420 | A1* | 3/2016 | Ji | B25J 5/00 348/148 |
| 2016/0127931 | A1* | 5/2016 | Baxley | H04K 3/22 455/67.16 |
| 2017/0361468 | A1* | 12/2017 | Cheuvront | A47L 9/2857 |
| 2018/0252528 | A1* | 9/2018 | Zhuang | G01S 5/02 |
| 2020/0088524 | A1* | 3/2020 | Shin | B25J 19/02 |

OTHER PUBLICATIONS

Martin Vossiek et al., "Wireless Local Positioning", IEEE Microwave Magazine, Dec. 2003, p. 77-86.

Morgan Quigley et al., "Sub-Meter Indoor Localization in Unmodified Environments with Inexpensive Sensors", The 2010 IEEE/RSJ International Conference on Intelligent Robots and Systems, Oct. 18-22, 2010, p. 2039-2046.

Piotr Mirowski et al., "Depth Camera SLAM on a Low-cost WiFi Mapping Robot", Technologies for Practical Robot Applications (TEPRA), Apr. 23, 2012, 6 pages.

European Search Report dated May 24, 2018 in connection with European Patent Application No. 17 20 7568.

Communication pursuant to Article 94(3) EPC dated Sep. 23, 2019 in connection with European Patent Application No. 207 17 568.1, 4 pages.

* cited by examiner

FIG. 6

| AP | S1 | S2 | S3 | S4 | S5 | S6 | S7 | S8 | S9 | S10 | S11 |
|---|---|---|---|---|---|---|---|---|---|---|---|
| SIGNAL STRENGTH | 23 | 1 | 2 | 3 | 43 | 45 | 34 | 3 | 13 | 1 | 1 |

FIG. 16

| A1 | S1 | S2 | S3 | S4 | S5 | S6 | S7 | S8 | S9 | S10 |
|---|---|---|---|---|---|---|---|---|---|---|
| SIGNAL STRENGTH | 3 | 43 | 42 | 48 | 9 | 1 | 1 | 2 | 27 | 24 |

74a

MOVABLE OBJECT AND CONTROL METHOD THEREOF

CROSS-REFERENCE TO RELATED APPLICATION

This application is related to and claims priority to Korean Patent Application No. 10-2016-0173535, filed on Dec. 19, 2016, the contents of which are incorporated herein by reference.

TECHNICAL FIELD

The present disclosure relates to a movable object and a control method thereof.

BACKGROUND

A movable object is a device that can move between a plurality of locations. A movable object can move from one specific location to another by using at least one mode of movement.

SUMMARY

It is a primary object to provide a movable object capable of recognizing its current location despite changes in environmental factors and a method of controlling the movable object.

A movable object may use at least one mode of movement provided for the movable object such as wheels, rails, or walking legs.

A movable object may be moved by a user controlling various separate means of control, for example, a keyboard or a joystick. Also, a movable object may collect external information by means of a sensor or the like and then move according to the collected information. For example, a movable object may capture an image of its surroundings, extract feature points from the captured image, determine a destination location or a current location on the basis of the extracted feature points, and then move to the determined destination location and current location.

Such a movable object may include, for example, equipment, robots, or devices such as vehicles, carts, trains, cleaning robots, toy cars, construction equipment, movable medical devices, or unmanned vehicles used for household, industrial, medical, or military purposes.

Additional aspects of the disclosure will be set forth in part in the description which follows and, in part, will be obvious from the description, or may be learned by practice of the disclosure.

In accordance with one aspect of the present disclosure, a movable object control method includes acquiring at least one image of a movable object's surroundings, acquiring at least one signal having strength changing depending on a location of the movable object, generating at least one map including the at least one image of the surroundings of the movable object and the at least one signal, and applying the at least one map to an algorithm to acquire a learned algorithm.

The at least one image of the surroundings of the movable object may include at least one omnidirectional image.

The movable object control method may further include converting the at least one omnidirectional image into at least one panoramic image.

The application of the at least one map to an algorithm to acquire a learned algorithm may include applying the at least one panoramic image and the at least one signal to the algorithm to acquire the learned algorithm.

The application of the at least one map to an algorithm to acquire a learned algorithm may include shifting the at least one panoramic image and applying the shifted panoramic image and the signal to the algorithm to acquire the learned algorithm.

The learned algorithm may include an algorithm for the location of the movable object corresponding to the signal and the image of the surroundings of the movable object.

The algorithm may use at least one of a deep neural network (DNN), a convolutional neural network (CNN), a recurrent neural network (RNN), a deep belief network (DBN), or a deep Q-Network.

The application of the at least one map to an algorithm to acquire a learned algorithm may include acquiring the location of the movable object from the map and applying the signal, the image of the surroundings of the movable object included in the map, and the location of the movable object to the algorithm to acquire the learned algorithm.

The movable object control method may further include further acquiring information regarding an orientation of the movable object from the map.

The generation of at least one map on the basis of the signal and the image of the surroundings of the movable object may include grouping at least one of the signal and the image of the surroundings of the movable object into a plurality of groups, acquiring a plurality of sub-maps for each of the plurality of groups, and generating the map by combining the plurality of sub-maps.

The movable object control method may further include vectorizing the signal.

In accordance with another aspect of the present disclosure, a movable object includes an image acquirer configured to acquire an image of the movable object's surroundings, a communicator configured to receive an external signal having strength changing depending on a location of the movable object, and a controller configured to generate a map on the basis of the signal and the image of the surroundings of the movable object and apply the map to an algorithm to acquire a learned algorithm.

The image of the surroundings of the movable object may include an omnidirectional image.

The controller may convert the omnidirectional image into a panoramic image and apply the panoramic image to the algorithm.

While shifting the panoramic image at least one time, the controller may apply the shifted panoramic image to the algorithm.

The movable object may further include an orientation detector configured to acquire information regarding an orientation of the movable object.

The controller may further apply the information regarding an orientation of the movable object to the algorithm to acquire the learned algorithm.

The controller may group the signal and the image of the surroundings of the movable object into a plurality of groups, acquire a plurality of sub-maps for each of the plurality of groups, and combine the plurality of sub-maps to generate a map.

When a location determination operation is initiated, the controller may apply the image of the surroundings of the movable object acquired by the image acquirer and the signal received by the communicator to the learned algorithm to determine the location of the movable object.

The movable object may further include a satellite signal receiver configured to receive a satellite signal.

The controller may further use the satellite signal to generate the map or may further apply the satellite signal to the algorithm to acquire the learned algorithm.

In accordance with still another aspect of the present disclosure, a cleaning robot includes an image acquirer configured to acquire an image of a movable object's surroundings, a communicator configured to receive an external signal having strength changing depending on a location of the movable object, and a controller configured to generate a map on the basis of the signal and the image of the surroundings of the movable object and apply the map to an algorithm to acquire a learned algorithm.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer-eadable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not roost instances, such definitions apply to prior, as well as fixture uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a table of an example of signal vectorization;

FIG. 16 illustrates a diagram of an example of vectorization of an acquired signal;

DETAILED DESCRIPTION

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The term "unit," as used herein, may be implemented in software or hardware and may be implemented using one component or a plurality of components depending on embodiments.

In this disclosure below, when one part is referred to as being connected to another part, it should be understood that the former can be physically connected to the latter or electrically connected to the latter.

Furthermore, when one part is referred to as comprising (or including or having) another part, it should be understood that the former does not preclude parts other than the latter unless specifically stated otherwise and may further comprise (or include or have) the other parts depending on a designer's selection.

The term "first," "second," or the like is used to distinguish one part from another, and thus it should not be understood that the parts are sequentially provided or performed unless specifically stated otherwise.

Also, the singular forms "a," "an," and "the" are intended to include the plural forms as well, unless context dictates otherwise.

Figure 1:
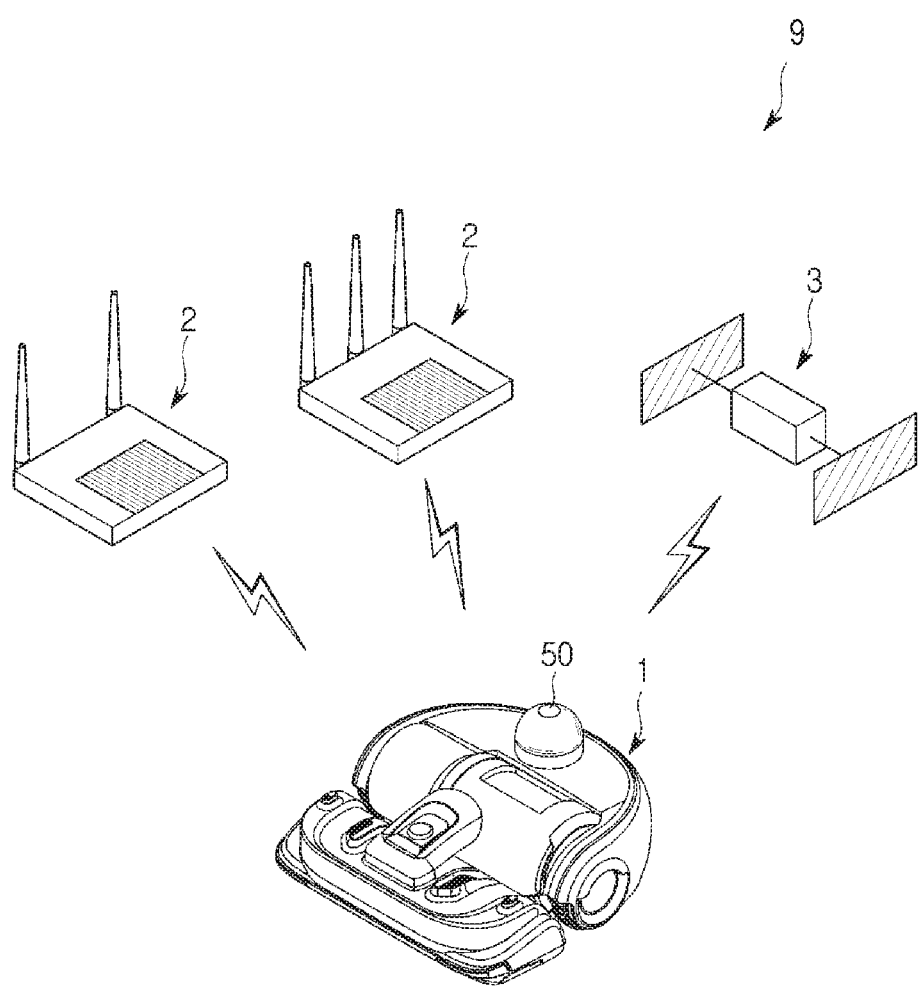
FIG. 1 illustrates a diagram of an embodiment of a movable object control system.

FIG. 1 illustrates a diagram of an embodiment of a movable object control system.

Referring to FIG. 1, a movable object control system 9 may include a movable object 1, a signal transceiver 2 capable of communicating with the movable object 1, and an artificial satellite 3 configured to provide information regarding a geographic location to the movable object 1.

The movable object 1 and the signal transceiver 2 are provided to perform wireless communication with each other by using radio waves. In this case, the movable object 1 and the signal transceiver 2 may transmit and receive data to and from each other by using at least one of a WiFi signal, a WiFi Direct signal, a Zigbee signal, a Bluetooth signal, a Bluetooth Low Energy (BLE) signal, a Near Field Communication (NFC), and a mobile communication signal. The mobile communication signal may include a communication signal emitted from the signal transceiver 2 according to at least one mobile communication standard such as 3GPP, 3GPP2, or IEEE series.

The strengths of signals delivered between the movable object 1 and the signal transceiver 2 may differ depending on the distance between the movable object 1 and the signal transceiver 2. For example, the strengths of the signals delivered therebetween may relatively decrease as the distance between the movable object 1 and the signal transceiver 2 decreases, and may relatively increase as the distance between the movable object 1 and the signal transceiver 2 increases.

The movable object 1 may receive a radio wave signal (a satellite signal) associated with geometric information from an artificial satellite. The movable object 1 may receive a radio wave signal appropriate for a navigation system used to locate the movable object 1. Here, the navigation system may include a global navigation satellite system (GNSS), and the global navigation satellite system (GNSS) may include the Global Positioning System (GPS), the Galileo system, or the Global Orbiting Navigational Satellite System (GLONASS). In addition, the global navigation satellite system may include various kinds of satellite navigation systems that are individually provided for regions.

The signal transceiver 2 may be implemented using a designated device capable of communicating with the movable object 1. For example, when the movable object 1 and the signal transceiver 2 communicate with each other using WiFi, the signal transceiver 2 may be implemented, for example, using a WiFi router.

Figure 2:
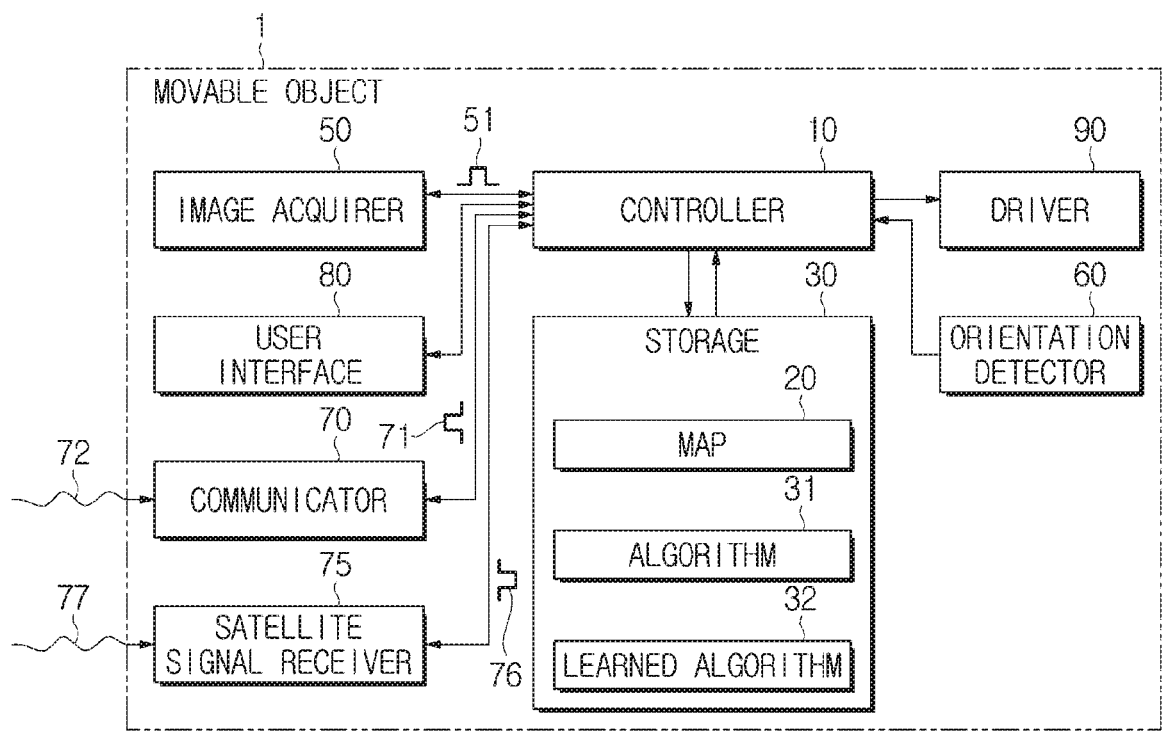
FIG. 2 illustrates a block diagram of an embodiment of a movable object.

FIG. 2 illustrates a block diagram of an embodiment of a movable object.

Referring to FIG. 2, the movable object 1 may include a controller 10, a storage 30, an image acquirer 50, a communicator 70, and a satellite signal receiver 75.

The controller 10 is provided to control the overall operation of the movable object 1.

The controller 10 may be electrically connected with the storage 30, the image acquirer 50, the communicator 70, and the satellite signal receiver 75 through wires or circuits. The controller 10 may receive designated data from the storage 30, the image acquirer 50, the communicator 70, and the satellite signal receiver 75 in the form of an electrical signal; transmit a designated control signal to the storage 30, the image acquirer 50, the communicator 70, and the satellite signal receiver 75; and control operations of the storage 30, the image acquirer 50, the communicator 70, and the satellite signal receiver 75.

The controller 10 may individually receive electrical signals 51, 71, and 76 from the image acquirer 50, the communicator 70, and the satellite signal receiver 75 and perform various processing operations on the basis of the received electrical signals 51, 71, and 76.

According to an embodiment, the controller 10 may generate and acquire a map 20 on the basis of an image 51 acquired by the image acquirer 50 and the strength of a signal received through the communicator 70. Also, the controller 10 may learn an algorithm 31 by applying the acquired map 20 to the algorithm 31 in response to the acquisition of the map 20. Thus, a learned algorithm 32 is acquired.

The learned algorithm 32 indicates the location of the movable object 1 corresponding to images of the surroundings of the movable object 1 and the received signals 72 and 77.

Also, the controller 10 may estimate and/or determine the location of the movable object 1 by applying the image 51 acquired by the image acquirer 50 and the strength of the signal 72 received through the communicator 70 to the learned algorithm 32. Also, the controller 10 may estimate and/or determine the location of the movable object 1 by using the image 51 acquired by the image acquirer 50 and the satellite signal 77 received by the satellite signal receiver 75.

Figure 4:
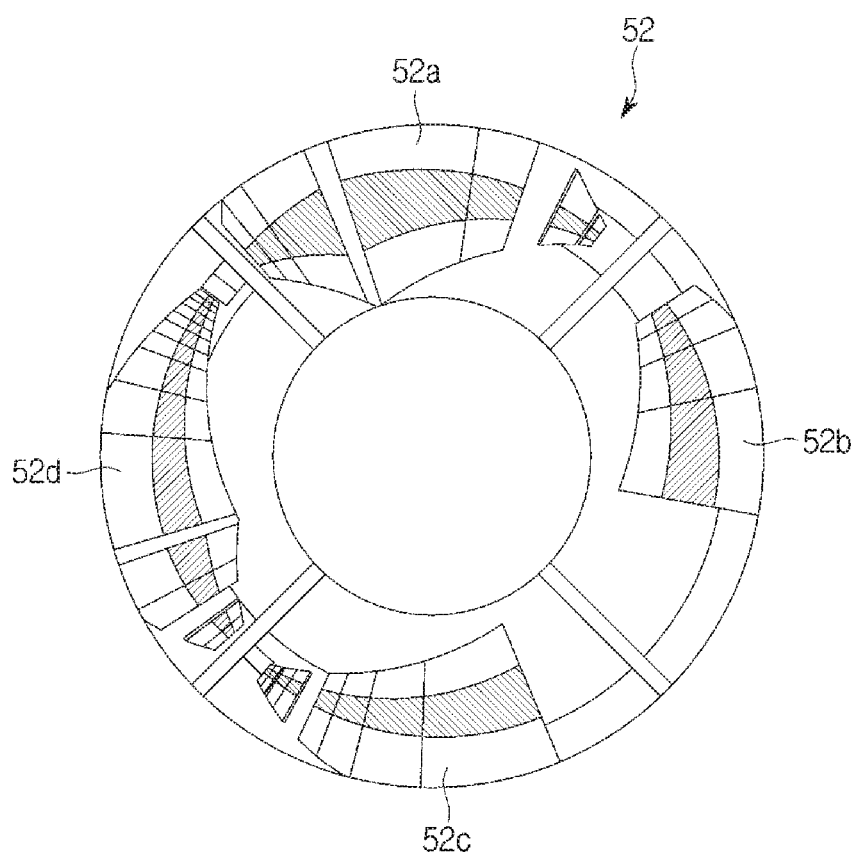
FIG. 4 illustrates an example of an omnidirectional image.
Figure 5:
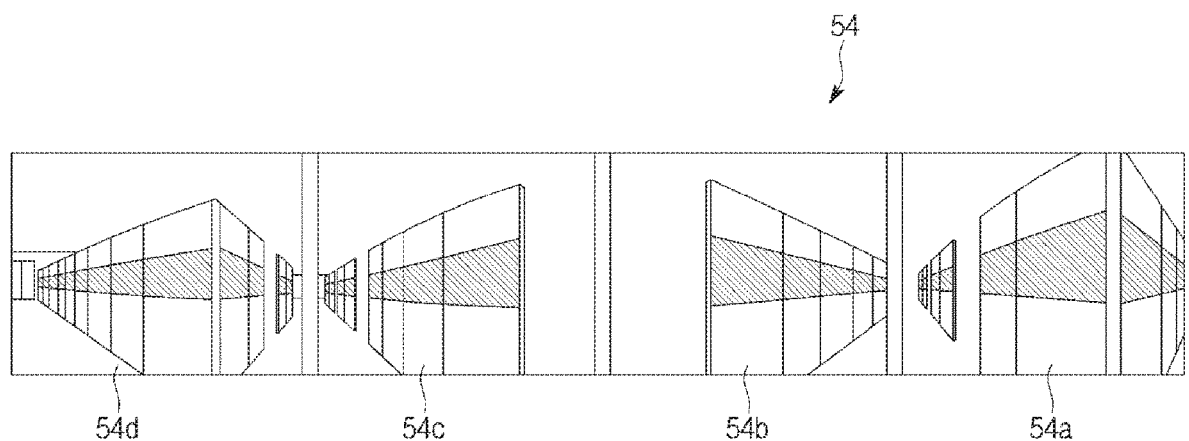
FIG. 5 illustrates an example of a panoramic image.

The controller 10 may convert an omnidirectional image 52 (see FIG. 4) acquired by the image acquirer 50 into a panoramic image 54 (see FIG. 5).

In addition, the controller 10 may determine the strength of received signals 72 that are transmitted from at least one signal transceiver 2. The controller 10 may vectorize at least one signal 72 corresponding to the at least one signal transceiver 2 to acquire a signal vector 74 (see FIG. 6).

The operation of the controller 10, for example a process of generating the map 20 by the controller 10, a process of acquiring the learned algorithm 32, and a process of estimating and/or determining the location of the movable object 1 will be described below in detail.

Also, depending on the embodiment, the controller 10 may be electrically connected with a user interface 80 to receive a user command input through the user interface 80 and perform an operation according to the received user command. For example, the controller 10 may perform the operation of generating the map 20 or the operation of acquiring the learned algorithm 32 according to a command for generating the map 20 or a command for learning the map 20. Also, the controller 10 may deliver information regarding whether the map 20 has been generated, information regarding whether the learning of the algorithm 31 is complete, information regarding the learned algorithm 32, or the like to the user interface 80 and may control the user interface 80 to provide the information to a user, Also, the controller 10 may generate a control command and deliver the generated control command to a driver 90. In this case, the generated control command may correspond to a user command.

According to an embodiment, the control command generated by the controller 10 may correspond to a predetermined operation for the process of generating the map 20. In detail, when movable object 1 is to move during the process of generating the map 20, the controller 10 may generate a control signal associated with the movement of the movable object 1, deliver the generated control signal to the driver 90, and control the movable object 1 so that the movable object 1 may move.

Also, according to an embodiment, the control command generated by the controller 10 may correspond to a result of locating the movable object 1. For example, when the location of the movable object 1 is determined using the learned algorithm 32, the controller 10 may control the movable object 1 so that the movable object 1 may move, rotate, or stop moving depending on the determined location.

According to an embodiment, the controller 10 may be implemented using at least one of a central processing unit (CPU), a micro controller unit (MCU), and a graphic processing unit (GPU). Depending on the embodiment, the controller 10 may be implemented using a plurality of physical devices. In this case, for example, some functions of the controller 10 may be performed by a CPU and the other functions may be performed by a GPU.

The storage 30 is provided to store various kinds of information for the operation of the movable object 1. The storage 30 may provide the stored data to the controller 10 when summoned by the controller 10 and also may store various kinds of information according to the control of the controller 10. The storage 30 includes a main memory device and an auxiliary memory device.

The storage 30 may be implemented using a semiconductor storage medium such as a RAM/ROM, a solid state drive (SSD), or a flash memory, implemented using a magnetic disk storage medium such as a hard disk or implemented using a magnetic drum storage medium or an optical recording medium.

According to an embodiment, the storage 30 may store the learned algorithm 32 acquired according to the control of the controller 10. Also, the storage 30 may further include the map 20 or a designated algorithm to generate the learned algorithm 32 according to the control of the controller 10.

The map 20 indicates information regarding a space in which the movable object 1 may travel (hereinafter referred to as a traveling space 99 (see FIG. 3)) being represented in a designated format.

The map 20 may include at least one of a two-dimensional (2D) map and a three-dimensional (3D) map for the space in which the movable object 1 may travel.

The map 20 may include a map 29 (see FIG. 10) for the entire space in which the movable object 1 is to travel. Also, depending on the embodiment, the map 20 may include a map for a portion of the entire space (hereinafter referred to as a sub-map 21 (see FIG. 8)).

According to an embodiment, the map 20 may be generated by the controller 10 on the basis of the image 52 acquired by the image acquirer 50. This will be described later.

The algorithm may be designed to output a value corresponding to an input value when a designated value is input and may be implemented in the form of a program or a database. Here, the input value may include at least one of the image 52 acquired by the image acquirer 50, the panoramic image 54 acquired by the controller 10, the signal 72 received by the communicator 70, and the signal received by the satellite signal receiver 75. Also, the output value may include information regarding a location on the map 20, for example, 3D coordinates of the location. Also, the output value may include information regarding a location on the map 20 and information regarding an orientation of the movable object 1, for example, 6D coordinates.

The algorithm 31 may be used to generate the learned algorithm 32. According to an embodiment, the algorithm 31 may include a machine learning algorithm.

The learned algorithm 32 is acquired by learning the algorithm 31 by applying at least one of the image 52 acquired by the image acquirer 50, the panoramic image 54 acquired by the controller 10, the signal 72 received by the communicator 70, and the signal received by the satellite signal receiver 75 to the algorithm 31.

According to an embodiment, the learned algorithm 32 may be generated by the controller 10. Also, according to another embodiment, the learned algorithm 32 may be generated by a computing device provided separately from the movable object 1 or by another movable object. Here, the computing device may include at least one of a desktop computer, a laptop computer, a smartphone, a tablet PC, and a server-dedicated computing device.

The algorithm 31 or the learned algorithm 32 may be implemented using at least one of a deep neural network (DNN), a convolutional neural network (CNN), a recurrent neural network (RNN), a deep belief network (DBN), and a deep Q-Network or a combination thereof.

According to an embodiment, the map 20 or the algorithm 31 may be stored in a storage device of another external device, for example another computing device or another movable device, other than the storage 30 provided in the movable object 1. The map 20 or the algorithm 31 stored in the storage device of the external device may be delivered to the movable object 1 through the communicator 70, and the controller 10 may learn the algorithm 31 by using the delivered map 20 or the delivered algorithm 31.

The image acquirer 50 may capture the surroundings of the movable object 1 and acquire at least one image of the surroundings of the movable object 1.

The image acquirer 50 may capture the surroundings of the movable object 1, for example, using electromagnetic waves. Here, the electromagnetic waves may include designated electromagnetic waves that are typically used to acquire information regarding the surroundings of the movable object 1, such as visible rays, infrared rays, ultraviolet rays, radio waves, X rays, gamma rays, microwaves, or extra-low-frequency (ELF) electromagnetic waves.

In detail, the image acquirer 50 may be implemented using a camera, an infrared camera, or the like.

In this case, according to an embodiment, the image acquirer 50 may be implemented using an omnidirectional camera. The omnidirectional camera is a capturing device having a 360-degree field of view and is provided to capture images of the surroundings of the movable object 1 in all directions to acquire an omnidirectional image 52. In this case, an omnidirectional camera may capture images in all the directions or in some directions.

For example, the omnidirectional camera may include an imaging device and at least one reflector provided to guide light incident in all horizontal directions toward the imaging device. In this case, the at least one reflector may include a first reflector configured to upwardly or downwardly reflect horizontally incident light and a second reflector configured to reflect light reflected by the first reflector toward the imaging device. The light incident in all horizontal directions is reflected by the first reflector, and the light reflected by the first reflector may be emitted by the second reflector to the imaging device via a lens. Thus, the imaging device may acquire an omnidirectional image 52.

The communicator 70 may receive a signal 72 from an external source, for example the signal transceiver 2. The communicator 70 may include various components such as at least one communication chip, at least one antenna, and at least one substrate in order to communicate with the signal transceiver 2. For example, the communicator 70 may communicate with the signal transceiver 2 using at least one wireless communication technology such as WiFi. A signal received through the communicator 70 may be delivered to the controller 10.

The satellite signal receiver 75 may receive a satellite signal 77 from a satellite 3. The satellite signal receiver 75 may be implemented using a designated satellite communication module including a communication chip and an antenna, which may be used to communicate with the satellite 3. The signal received from the satellite signal receiver 75 may be delivered to the controller 10 in the form of an electrical signal 76.

The satellite signal receiver 75 may acquire information regarding the location of the movable object 1, for example coordinates of the location of the movable object 1 on a ground surface on the basis of the satellite signal 77. The acquisition of the location information of the movable object 1 on the basis of the satellite signal 77 may be performed by the controller 10.

According to an embodiment, the movable object 1 may further include an orientation detector 60. The orientation detector 60 may detect the orientation of the movable object 1, output an electrical signal corresponding to a result of the detection, and deliver the electrical signal to the controller 10. Here, the orientation of the movable object 1 may include at least one of a degree $\Psi$ to which the movable object 1 is tilted in a designated direction, a degree $\Phi$ to which the movable object 1 is tilted in a direction orthogonal to the designated direction, and a degree $\theta$ to which the movable object 1 rotates with respect to a line normal to a ground surface.

The orientation detector 60 may be implemented using, for example, various kinds of tilt sensors or revolution sensors. A tilt sensor may be implemented using at least one of, for example, a semiconductor tilt sensor, an acceleration sensor, and a gyro sensor. A revolution sensor may be implemented by employing at least one of, for example, an optical incremental encoder, an optical absolute encoder, a magnetic encoder, a resolver, and a potentiometer (POT). In addition, the orientation detector 60 may be implemented using various devices at the discretion of a designer.

According to an embodiment, the movable object 1 may further include a user interface 80.

The user interface 80 is configured to receive various kinds of commands associated with the operation of the movable object 1 from the user and/or provide various kinds of information regarding the operation or state of the movable object 1 to the user.

For example, the user interface 80 may include an input unit for receiving a designated command, for example a physical button, a touch button, a touchscreen, a touchpad, a joystick, a trackball, or a mouse device and a display including a display panel such as a liquid crystal display (LCD) or a lighting device such as a light emitting diode (LED). Also, the user interface 80 may include a sound output unit configured to output a voice or sound. In addition, the user interface 80 may include a connection port capable of receiving data from a connected device such as Universal Serial Bus (USB).

Through the user interface 80, the movable object 1 may receive at least one of the algorithm and the learned algorithm 32 from the user.

According to an embodiment, the movable object 1 may further include a driver 90.

The driver 90 may allow the movable object 1 to move from a designated location to another location or rotate on one point according to the control of the controller 10.

The driver 90 may be implemented using, for example, a motor or an actuator connected with at least one driving wheel or walking leg. Here, the motor may include a DC motor, an AC motor, a brushless DC (BLDC) motor, or a linear-induction motor.

An embodiment of a process of the movable object 1 acquiring the learned algorithm 32 using the map and the algorithm 31 will be described below with reference to FIGS. 3 to 12.

Figure 3:
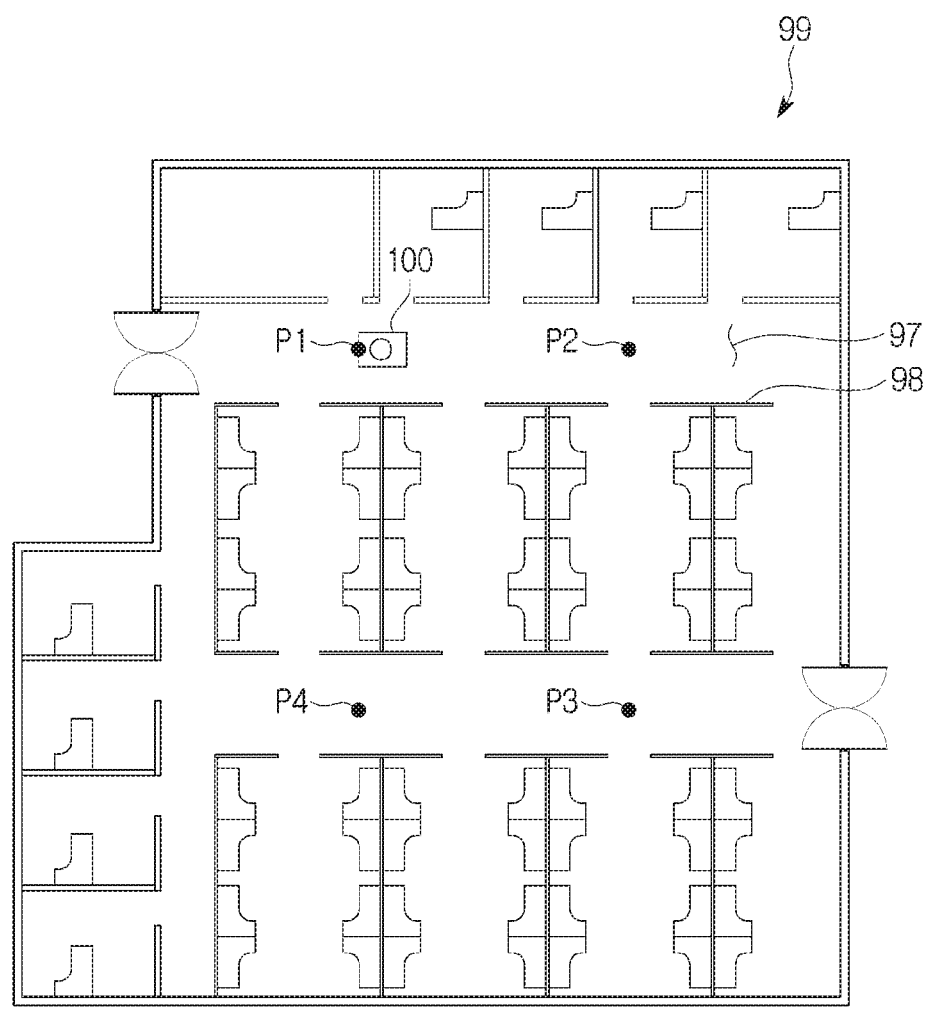
FIG. 3 illustrates a plan view of an example of a space in which a movable object may travel.

FIG. 3 illustrates a plan view of an example of a space in which a movable object may travel, and FIG. 4 illustrates an example of an omnidirectional image.

As shown in FIG. 3, a movable object 1 may be placed at at least one point in a traveling space 99 and may move in the traveling space 99.

The traveling space 99 may include for example, an internal space of a building, a road, a sidewalk, a tunnel, and/or a bridge. Here, the building may include various facilities such as single-family houses, multi-family houses, commercial buildings, factories, hospitals, schools, or warehouses. The internal space of the building may include a room, a living room, a kitchen, or the inside of a factory. The traveling space 99 may be defined differently depending on the type or properties of the movable object 1. For example, when the movable object 1 is a cleaning robot, the traveling space 99 may include an internal space of a single-family house or a multi-family house. Also, as another example, when the movable object 1 is an unmanned vehicle, the traveling space 99 may include an internal space of a factory building. In addition, the various spaces may be defined as a space where the movable object is placed.

The traveling space 99 may include a section 97 through which the movable object 1 can pass and a section 98 through which the movable object 1 cannot pass. The section 98 through which the movable object 1 cannot pass may include, for example, walls, columns, doors, various kinds of electronic products, mechanical devices, various kinds of spaces, and/or various kinds of things that may occupy a designated area. The section 97 through which the movable object 1 can pass may include all or some of the remaining sections other than the section 98 through which the movable object 1 cannot pass.

The movable object 1 may move in the traveling space 99 according to the operation of the driver 90. The movable object 1 may pass through a point among p1 to p4 in the traveling space 99 or stop moving at a point amoung p1 to p4. When the movable object 1 is placed at a point among p1 to p4 in the traveling space 99 according to user operation or a predefined setting, the movable object 1 may start to generate a map 20.

When the map starts to be generated, the image acquirer 50 of the movable object 1 may capture the surroundings of the movable object 1 to acquire images thereof in response to the generation.

According to an embodiment, the image acquirer 50 may acquire images of the surroundings of the movable object 1.

When the image acquirer 50 is implemented using cameras capable of acquiring images in a designated field of view, the movable object 1 rotates 360 degrees to acquire images in all directions, and the image acquirer 50 may periodically perform image capturing while the movable object 1 rotates. Thus, the movable object 1 may acquire images in all directions, that is, an omnidirectional image 52. Also, as another example, the movable object 1 may repeatedly rotate and stop in angular increments and the image acquirer 50 may capture an image whenever the movable object stops rotating to acquire the omnidirectional image 52.

When the image acquirer 50 is implemented by employing an omnidirectional camera, the image acquirer 50 may acquire an omnidirectional image 52 of the surroundings of the movable object 1, as shown in FIG. 4, by one-time capturing an image without the rotation of the movable object 1.

The omnidirectional image 52 acquired by the omnidirectional camera may include a relatively large amount of information regarding the surroundings of the movable object 1 compared to images captured by cameras. However, the information has a relatively low resolution, and the relatively low resolution may cause less influence due to noise during the location determination.

The image acquired by the image acquirer 50 may be delivered to the controller 10.

FIG. 5 illustrates an example of a panoramic image.

When the image delivered from the image acquirer 50 is an omnidirectional image 52 acquired by an omnidirectional camera, the controller 10 may convert the omnidirectional image 52 into a panoramic image 54 as shown in FIG. 5.

As shown in FIG. 4, the omnidirectional image 52 acquired by the omnidirectional camera has a circular shape, an elliptical shape, or a loop shape, and a target (a subject) near the movable object 1 is shown within and follows the circular shape, the elliptical shape, or the loop shape. Accordingly, this leads to a distortion of the captured target in the omnidirectional image 52.

According to an embodiment, the controller 10 may convert the omnidirectional image 52 into a panoramic image 54, as shown in FIG. 5, in order to correct the image distortion.

The controller 10 may acquire the panoramic image 54 by using an algorithm in order to convert the omnidirectional image 52 into the panoramic image 54. For example, the controller 10 may decompose the omnidirectional image 52 into a plurality of first unit images 52a to 52d, apply a designated conversion function to the first unit images 52a to 52d, convert the first unit images 52a to 52d into second unit images 54a to 54d having a square shape or rectangular shape, and combine the second unit images 54a to 54d to acquire the panoramic image 54. In this case, the designated conversion function may be designed to continuously or discretely extend or shorten images at different rates from an inner arc to an external arc or to maintain the first unit images 52a to 52d. The controller 10 may use an image stitching method to combine the second unit images 54a to 54d.

FIG. 6 illustrates a table of an example of signal vectorization. In FIG. 6, an upper row indicates an index for identifying the signal transceivers 2, and a lower row indicates the strengths of the signals 72 corresponding to the signal transceivers 2.

According to an embodiment, when the movable object 1 is placed at a point among p1 to p4 in the traveling space 99, the communicator 70 of the movable object 1 may receive a signal from at least one signal transceiver 2 and deliver the received signal 72 to the controller 10 in the form of an electrical signal 71.

The operation of receiving the at least one signal 72 of the communicator 70 may be performed at the same time, before, or after the image acquirer 50 acquires the omnidirectional image 52.

The controller 10 may acquire information regarding the received signal 72. The information regarding the received signal 72 includes, for example, the strength of the received signal 72. As described above, the strength of the signal 72 may change corresponding to a distance between the movable object 1 and the signal transceiver 2. In other words, the strength of the signal 72 may increase or decrease in proportion to the distance between the movable object 1 and the signal transceiver 2.

When a plurality of signal transceivers 2 can perform communication, the controller 10 may determine the strengths of signals 72 of the plurality of signal transceivers 2. Here, the strengths of the signals 72 of the plurality of signal transceivers 2 may indicate the absolute strengths of the signals delivered from the plurality of signal transceivers s1 to s11 or may indicate the relative strengths of the signals delivered from the plurality of signal transceivers s1 to s11.

According to an embodiment, the controller 10 may vectorize the strength of a signal 72 of at least one signal transceiver 2.

For example, as shown in FIG. 6, the controller 10 may match at least one or more signal transceivers s1 to s11 with the strengths of signals corresponding to the at least one or more signal transceivers s1 to S11 to vectorize the strength of the signal 72. Thus, a signal vector 74 is acquired.

According to an embodiment, when the movable object 1 is placed at a point among p1 to p4 in a predetermined space 99, the satellite signal receiver 75 may receive a satellite signal 77. At least one of the controller 10 and the satellite signal receiver 75 may acquire information regarding the location of the movable object 1 on the basis of the received satellite signal 77.

The operation of receiving the satellite signal 77 by the satellite signal receiver 75 may be performed at the same time, before, or after the image acquirer 50 acquires the omnidirectional image 52.

The controller 10 may acquire a signal vector on the basis of the satellite signal 77 as described above.

At least one of the operation of receiving the signal 72 by the communicator 70 and the operation of receiving the satellite signal 77 of the satellite signal receiver 75 may be omitted depending on whether the operation can be performed. For example, when no appropriate signal transceiver 2 is present near the movable object 1, only the operation of receiving the satellite signal 77 of the satellite signal receiver 75 may be performed. Also, when the movable object 1 is placed in a region where it is impossible or difficult to receive the satellite signal 77, such as an indoor space or an underground space, only the operation of receiving the signal 72 by the communicator 70 may be performed.

The operation of acquiring the image 52 by the image acquirer 50 and at least one of the operation of receiving the signal 72 by the communicator 70 and the operation of receiving the satellite signal 77 of the satellite signal receiver 75 may be performed at the plurality of points p1 to p4. That is, at each of the points p1 to p4, the image acquirer 50 may capture an image 52 of the surroundings of the movable object 1, and at least one of the communicator 70 and the satellite signal receiver 75 may receive a signal 72 or 77.

When the operation of acquiring the image 52 by the image acquirer 50, the operation of receiving the signal 72 by the communicator 70, and the operation of receiving the satellite signal 77 by the satellite signal receiver 75 are performed, the movable object 1 may keep moving or may temporarily stop moving at each of the points p1 to p4.

At least one of the image acquired by the image acquirer 50, the panoramic image 54 acquired by the controller 10, the signal 72 received by the communicator 70, and the satellite signal 77 received by the satellite signal receiver 75 may be stored in the storage 30. In this case, the image 52, the panoramic image 54, the signal 72, and/or the satellite signal 77 that are acquired at the same point among p1 to p4 are stored in the storage 30 in association with one another.

Figure 7:
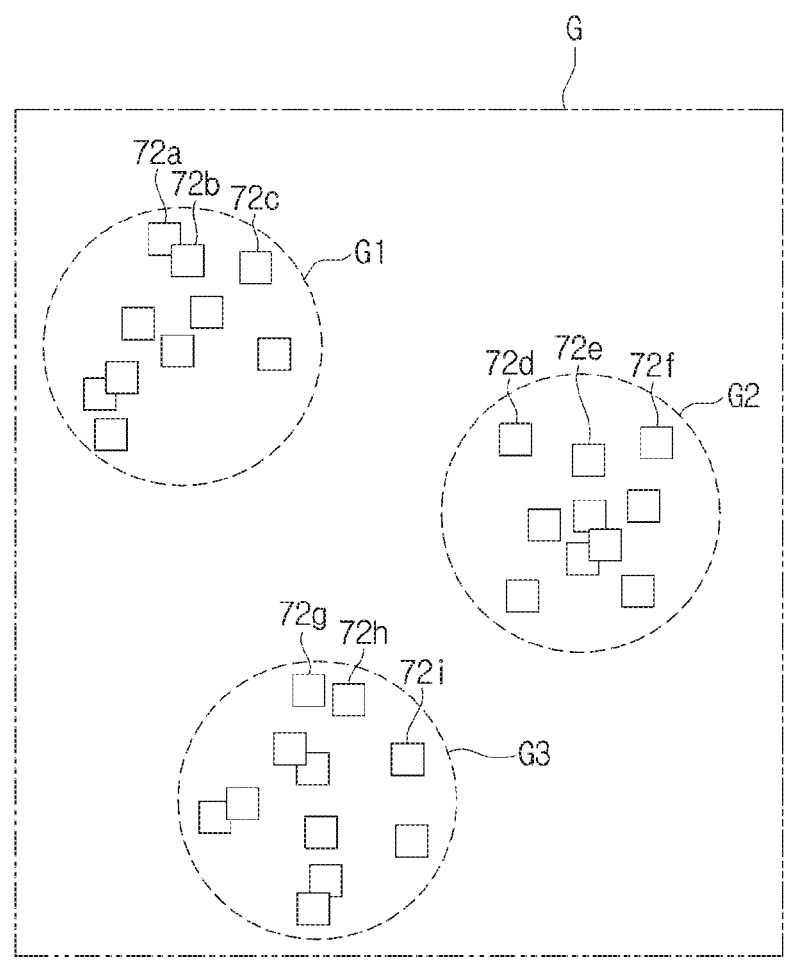
FIG. 7 illustrates a view of clusterization of a plurality of pieces of data.

FIG. 7 illustrates a view of clusterization of a plurality of pieces of data.

As described above, a plurality of signals 72 and 77 having different strengths may be received at each of the plurality of points p1 to p4. According to an embodiment, when the plurality of signals 72 and 77 having different strengths are received, the controller 10 may cluster the plurality of signals 72 and 77 according to the strengths of the signals 72 and 77.

For example, as shown in FIG. 7, when the communicator 70 receives signals 72$a$ to 72$i$ at a plurality of different points, the controller 10 may form at least one or more groups G1 to G3 by grouping signals having the same or similar strengths among the received signals 72$a$ to 72$i$.

For example, the controller 10 may detect signals having strengths lower than a certain value among the received signals 72$a$ to 72$i$, for example first to third signals 72$a$ to 72$c$, and may classify the first to third signals 72$a$ to 72$c$ as one group, for example, a first group G1.

Also, as another example, the controller 10 may determine signal vectors 74 corresponding to the received signals 72$a$ to 72$i$ and compare patterns of the signal vectors 74 of the signals 72$a$ to 72$i$. The controller 10 may detect at least one or more signals having the same or similar signal vectors 74 among the plurality of signals 72$a$ to 72$i$ and classify the detected signals as one group. In more detail, for example, as shown in FIG. 6, the controller 10 reads a signal vector 74 corresponding to any one signal, for example, a first signal 72$a$. As a result of the reading, the controller 10 determines that the strengths of signals received from at least one or more signal transceivers. For example, a first signal transceiver s1 and fifth to seventh signal transceivers s5 to s7 are greater than the strengths of signals received from the other signal transceivers s2 to s4 and s8 to s11. Subsequently, the controller 10 reads signal vectors of the other signals 72$b$ to 72$i$, compares the signals vectors with the signal vector 74 corresponding to the first signal 72$a$, and detects signal vectors having the same or similar vectors. The controller 10 may detect signals corresponding to the detected signal vectors, for example the second and third signals 72$b$ and 72$c$, and may group the first signal 72$a$ and the detected signals 72$b$ and 72$c$ to classify the detected signals as one group.

After the plurality of signals 72$a$ to 72$i$ are classified into one group, for example the first group G1, the controller 10 may add labels or tags to the signals 72$a$ to 72$c$ classified as any one group (G1) or store the signals 72$a$ to 72$c$ classified as any one group (G1) in a region different from those of signals 72$d$ to 72$i$ classified as other groups G2 and G3 so that the signals 72$a$ to 72$c$ classified as the first group G1 is distinguished from the signals 72$d$ to 72$i$ classified as other groups such as the second group G2 or the third group G3. Here, the region may be logically or physically distinct from another in a storage space.

The plurality of signals 72$a$ to 72$i$ are associated with the image 52, the panoramic image 54, and/or the satellite signal 77 that are acquired at the same points p1 to p4. Accordingly, when the plurality of signals 72$a$ to 72$i$ are clusterized, the image 52, the panoramic image 54, and/or the satellite signal 77 may also be clusterized along with the clusterization of the plurality of signals 72$a$ to 72$i$.

The above-described clusterization of the signals 72$a$ to 72$i$ may also be applied without change, or partially modified and then applied, to the clusterization of the image 52, the panoramic image 54, and/or the satellite signal 77. According to an embodiment, the controller 10 may clusterize at least one of the image 52, the panoramic image 54, and the satellite signal 77 instead of the signals 72$a$ to 72$i$.

The signal clusterization may be omitted depending on the embodiment.

Figure 8:
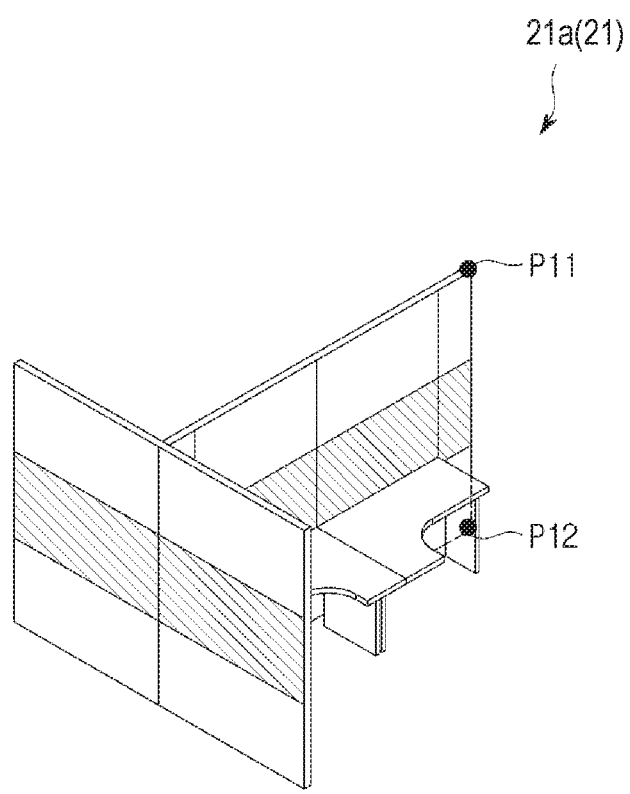
FIG. 8 illustrates a view of an example of a first sub-map.
Figure 9:
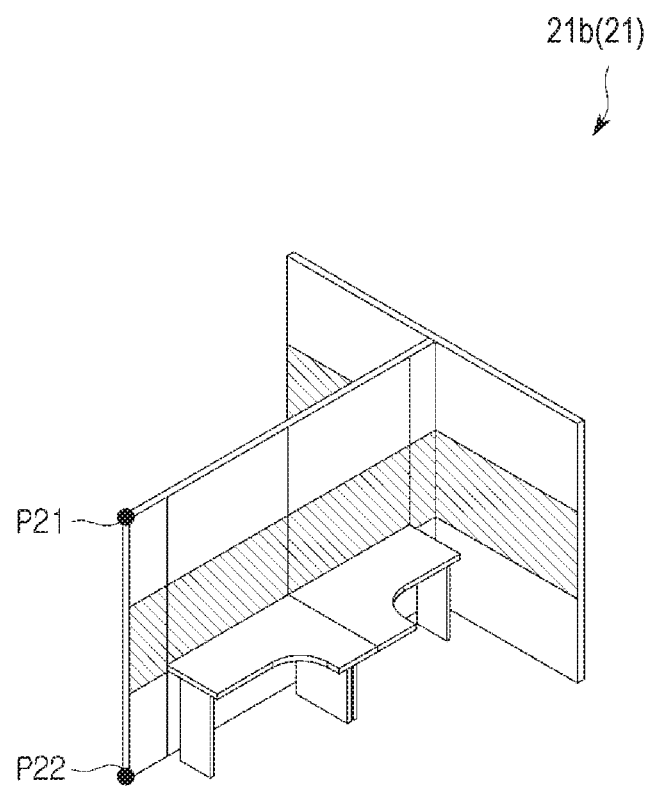
FIG. 9 illustrates a view of an example of a second sub-map.

FIG. 8 illustrates a view of an example of a first sub-map, and FIG. 9 illustrates a view of an example of a second sub-map.

When the signals 72$a$ to 72$i$ are classified in at least one or more groups G1 to G3, the controller 10 may form at least one sub-map 21 corresponding to the plurality of groups G1 to G3 by using a result of the clusterization. The sub-map 21 indicates a 2D or 3D map of a portion of a target. Here, the target may include various kinds of structures, for example, walls, doors, pieces of furniture, or machines, which are located in a space where the movable object 1 will move. Also, the target may include internal and external structures of a building structure that provides a space where the movable object 1 will move.

For example, as shown in FIG. 8, the controller 10 may generate a first sub-map 21$a$ by using images 52 and 54 corresponding to signals 72$a$ to 72$c$ of the first group G1. Also, as shown in FIG. 9, the controller 10 may generate a second sub-map 21$b$ by using images 52 and 54 corresponding to signals 72$d$ to 72$f$ of the second group G2. Here, the images 52 and 54 corresponding to the signals 72$a$ to 72$c$ of the first group G1 may include an omnidirectional image 52 captured at a point that is the same or near a point at which the signals 72$a$ to 72$c$ of the first group G1 are received or may include a panoramic image 54 acquired from the omnidirectional image 52 captured at the same or nearby point. Images 52 and 54 corresponding to the signals 72$d$ to 72$f$ of the second group G2 are also the same case.

According to an embodiment, the controller 10 may acquire at least one sub-map corresponding to at least one group G1 to G3 by using a 3D restoration method. The 3D restoration method may include, for example, structure from motion (SFM).

The SFM indicates a method of measuring information regarding a target, for example, measuring a degree of change from a change in the target and acquiring a structure of the target on the basis of the measurement. According to the SFM, it is possible to determine a 3D structure of the target from a 2D image of the target. Also, when the SFM is used, it is possible to set or define absolute or relative coordinates of each point of the 3D structure of the target while acquiring the 3D structure of the target.

Each group G1 to G3 may include a plurality of signals 72$a$ to 72$c$, 72$d$ to 72$f$, or 72$g$ to 72$i$. The plurality of signals 72$a$ to 72$c$, 72$d$ to 72$f$, or 72$g$ to 72$i$ each correspond to a plurality of images 52 and 54. Accordingly, each group G1 to G3 may correspond to a plurality of omnidirectional images 52 and/or a plurality of panoramic images 54. Also, the plurality of omnidirectional images 52 and/or the plurality of panoramic images 54 are captured at a plurality of different points, and thus the plurality of omnidirectional images 52 and/or the plurality of panoramic images 54 are different from each other. Accordingly, a change in the target may be detected from the plurality of omnidirectional images 52 and/or the plurality of panoramic images 54. Accordingly, when the SFM is applied to the plurality of omnidirectional images 52 and/or the plurality of panoramic images 54, it is possible to acquire a 3D structure of a target appearing in the plurality of omnidirectional images 52 and/or the plurality of panoramic images 54. In addition, it is also possible to acquire location information of each point in the 3D structure of the target appearing in the plurality of omnidirectional images 52 and/or the plurality of panoramic images 54, for example 3D coordinates of each point in the 3D structure.

Furthermore, various kinds of 3D restoration methods may be employed to generate the sub-map 21.

Figure 10:
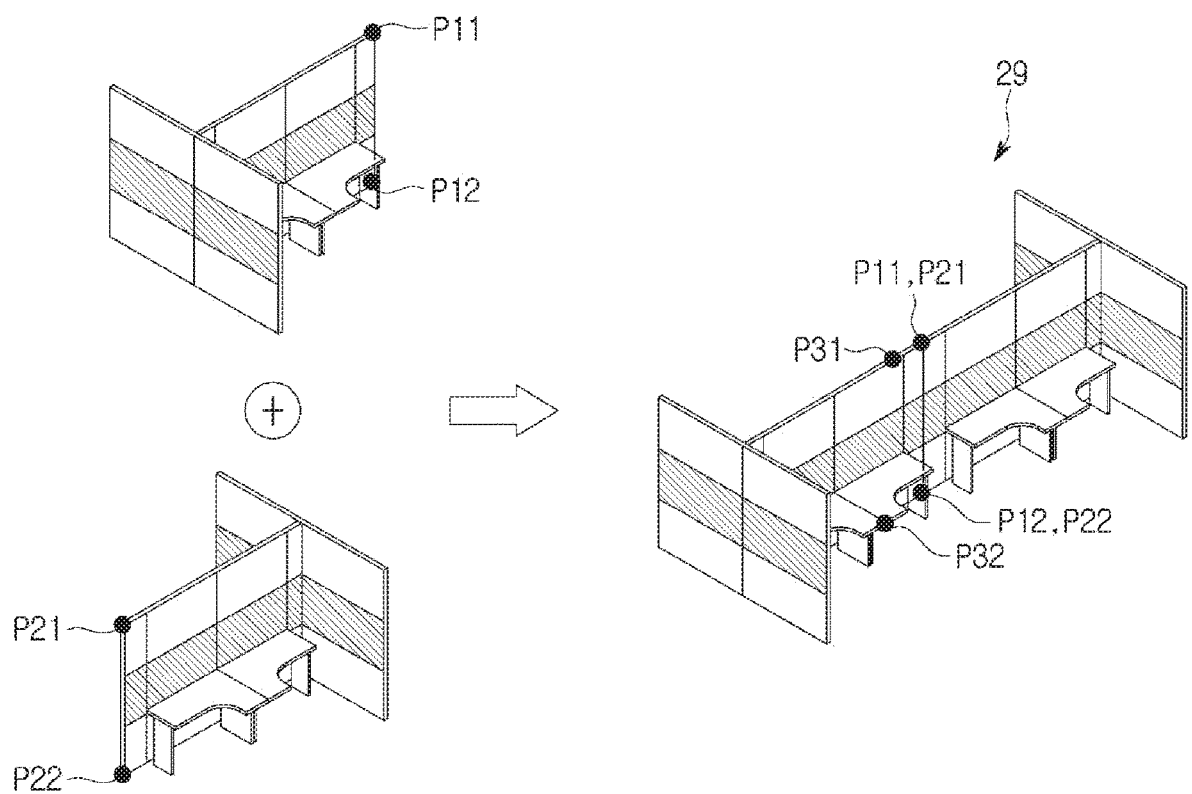
FIG. 10 illustrates a view of an example of acquisition of a three-dimensional (3D) map based on a sub-map.

FIG. 10 illustrates a view of an example of acquiring a 3D map based on a sub-map.

As shown in FIG. 10, when a plurality of sub-map 21a and 21b are acquired, the controller 10 may combine the plurality of sub-maps 21a and 21b to acquire a map 29 of a space in which the movable object 1 will travel. The map 29 acquired through the combination may be a map of the entire space in which the movable object 1 can move.

The controller 10 may detect corresponding points p11 and p21 or p12 and p22 from the plurality of sub-maps 21a and 21b and may combine the corresponding points p11 and p21 or p12 and p22 to combine the plurality of sub-maps 21a and 21b. For example, after the controller 10 detects at least one or more points p11 and p12 at one end of the first sub-map 21a and detects at least one or more points p21 and p22 at the other end of the second sub-map 21b, the controller 10 may combine the plurality of sub-maps 21a and 21b by matching the at least one or more points p11 and p12 at one end of the first sub-map 21a with the at least one or more points p21 and p21 at the other end of the second sub-map 21b. In this case, the controller 10 may combine the plurality of sub-maps 21a and 21b by using coordinates of at least one point existing on each of the plurality of sub-maps 21a and 21b.

Depending on the embodiment, the map 29 acquired through the combination may be a map of a portion of the entire space in which the movable object 1 can move. When a map of a portion of a target is acquired by combining the plurality of sub-maps 21a and 21b, the controller 10 may combine another sub-map or a map of a portion of a target generated by combining other sub-maps with a map of a portion of a target generated by combining the plurality of sub-maps 21a and 21b to acquire the map 29 of the space in which the movable object 1 will move.

Corresponding coordinates may be mapped to points p31 and p32 of the map 29 of the space in which the movable object 1 will move. Also, corresponding images 52, panoramic images 54, signals 74, and/or satellite signals 77 may be mapped to points p21 and p22 of the map 29 of the space in which the movable object 1 will move.

Figure 11:
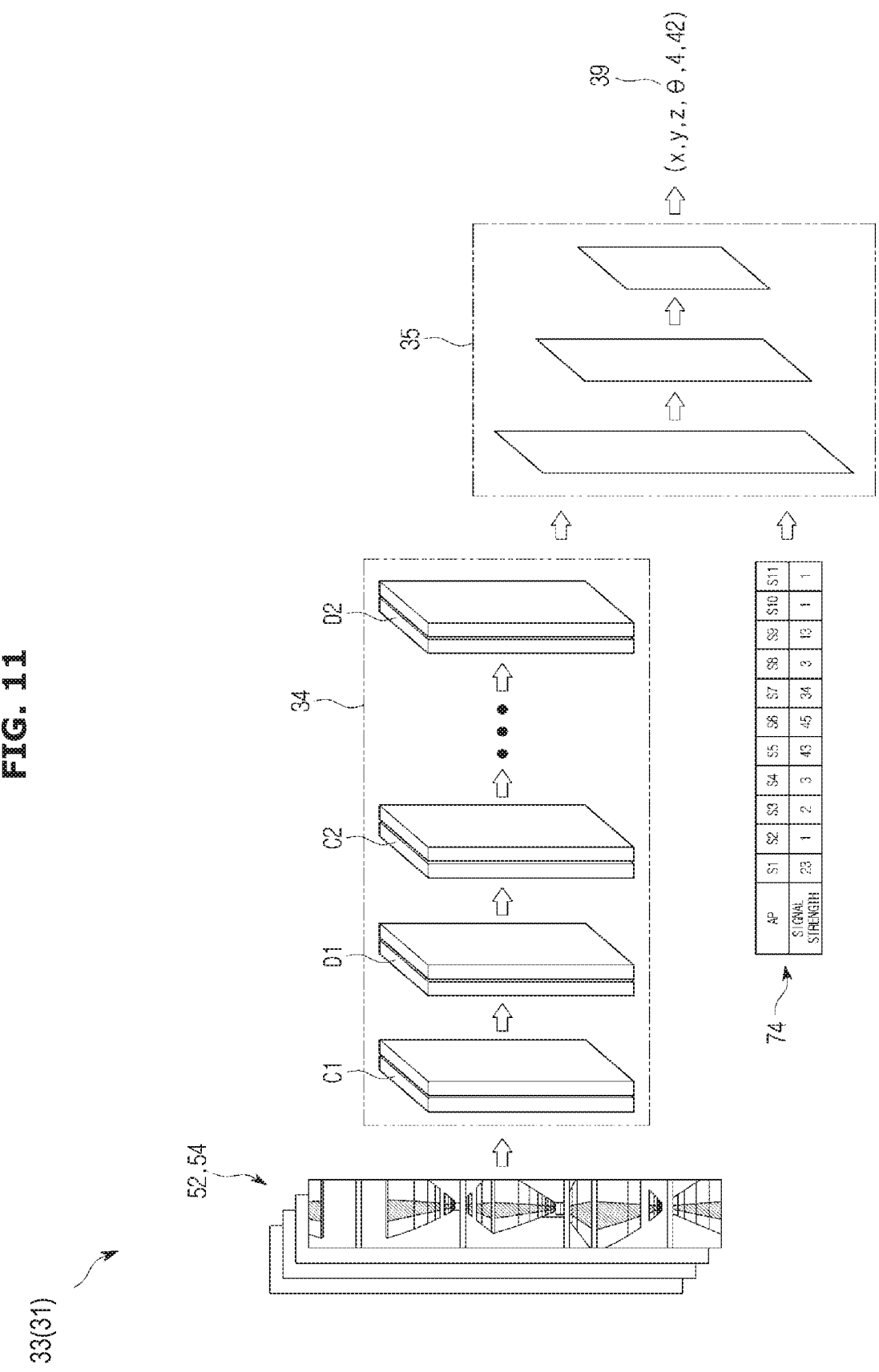
FIG. 11 illustrates a diagram of an example of a learning algorithm.

According to an embodiment, the signal clusterization will be omitted, and thus the generation of the plurality of sub-maps will be omitted. In this case, the controller 10 may apply the SFM to all the acquired images 52 and 54 to acquire the map 29 of the entire target, FIG. 11 illustrates a diagram of an example of a learning algorithm. FIG. 11 illustrates a learning algorithm, for example a deep neural network algorithm.

The controller 10 may learn at least one algorithm 31 by applying an acquired map 20 to the algorithm 31.

As shown in FIG. 11, a deep neural network algorithm 33 may include at least one or more hidden layers 34 and 35.

The learning of the algorithm will be described below with reference to an embodiment in which the deep neural network algorithm 33 includes two hidden layers (hereinafter referred to as a first hidden layer 34 and a second hidden layer 35). However, the number or types of hidden layers 34 and 35 of the deep neural network algorithm 33 are not limited to the following description. Depending on the embodiment, the deep neural network algorithm 33 may include three or more hidden layers.

Predetermined images 52 and 54 may be input to the first hidden layer 34. An image input to the first hidden layer 34 may be an omnidirectional image 52 acquired by the image acquirer 50 or a panoramic image 54 acquired by the controller 10.

According to an embodiment, the first hidden layer 34 may include at least one or more convolution layers c1 and c2 and at least one or more pooling layers d1 and d2.

The input images 52 and 54 are input to the first convolution layer c1. In the first convolution layer c1, convolution is performed on the input images 52 and 54. Through the convolution performed in the first convolution layer c1, the input images 52 and 54 may be reduced in size and also may be partially modified in shape.

The first convolution layer c1 outputs at least one feature map for the input images 52 and 54 according the performed convolution. In more detail, in the first convolution layer c1, a convolution kernel may be applied to all or some of the input images 52 and 54, and thus a new pixel value may be calculated for each pixel. As described above, the feature map is acquired by the calculated pixel value.

For example, at least one section is selected from among a plurality of elements (e.g., pixels or voxels) constituting the input images 52 and 54 in the first convolution layer c1, and at least two elements corresponding to the at least one section, that is, two pixel values, are summed or weighted summed. Thus, it is possible to acquire a result value corresponding to the at least one section. The above-described process may be repeated at least one time. Accordingly, it is possible to determine result values of a plurality of sections. The plurality of result values may be combined, and a feature map corresponding to the input images 52 and 54 may be acquired as a result of the combination.

Depending on the embodiment, at least one section may overlap other sections. In other words, at least one element of the images 52 and 54 included in any one selected section may also be included in another selected selection.

The feature map is delivered to a first pooling layer d1. The delivered feature map may have a form of, for example, a 2D matrix. Depending on the embodiment, an activation function may be further applied to the acquired feature map.

Sub-sampling may be performed on the first pooling layer d1. A smaller result value than that of the input feature map may be output from the first pooling layer d1 due to the performed sub-sampling.

In more detail, at least one section of the feature map is selected from the first pooling layer d1, and the sub-sampling is performed on the basis of values of a plurality of elements in the at least one section. The sub-sampling may be used to acquire a result value by calculating an average of the values of the plurality of elements in the at least one section through average pooling or by selecting a value corresponding to a designated criterion, for example a maximum value from among a plurality of elements through max pooling.

Data acquired by performing sub-sampling in the first pooling layer d1 may be sequentially delivered to the second convolution layer c2 and the second pooling layer d2. Like the first convolution layer c1, convolution is performed on result data delivered by the first pooling layer d1 in the second convolution layer c2. Result data output by the second convolution layer c2 may be delivered to the second pooling layer d2. Like the first pooling layer d1, the sub-sampling may be performed again in the second pooling layer d2.

FIG. 11 illustrates an example in which the first hidden layer 34 includes two convolution layers c1 and c2 and two pooling layers d1 and d2, but this is just an example. Depending on the embodiment, the first hidden layer 34 may include one convolution layer and one pooling layer or may include three or more convolution layers and three or more pooling layers.

Result data acquired by passing through the convolution layers c1 and c2 and the pooling layers d1 and d2 may be delivered to the second hidden layer 35. The result data output by the first hidden layer 34 is used as an input value of the second hidden layer 35.

Also, a signal vector 74 may be further input to the second hidden layer 35. The signal vector 74 makes more robust a location determination result obtained by using the learned algorithm.

The second hidden layer 35 may include an omnidirectional layer (a feed forward layer).

According to an embodiment, data acquired from the second hidden layer 35, that is, an output result and a signal vector 74 of the first hidden layer 34, may be recognized and/or classified. The second hidden layer 35 may include a fully connected neural network. The fully connected neural network includes a plurality of neurons, and at least two of the plurality of neurons are connected to each other so that an input (i.e., images 52 and 54) may be fully connected to an output (i.e., location information 39).

Depending on the embodiment, the second hidden layer 35 may be implemented using regression approaches, and the regression approaches may include various regression methods that are available during a learning process, such as linear regression or logistic regression.

Information 38 regarding points p1 to p4 corresponding to at least one of the input omnidirectional image 52 and panoramic image 54 is applied to the output of the second hidden layer 35. The information 38 regarding the points p1 to p4 may include 3D coordinates of the points among p1 to p4 at which the omnidirectional image 52 is acquired. In this case, the 3D coordinates of the points p1 to p4 may be acquired from the acquired map 20. When the 3D restoration method is used as described above, it is possible to acquire coordinates of points of the restored 3D structure, and also possible to acquire 3D coordinates of the points p1 to p4 on the basis of the acquired coordinates.

Thus, the input images 52 and 54 may be reduced by the convolution layers c1 and c2 and the pooling layers d1 and d2 and then be input to the second hidden layer 35. The second hidden layer 35 is formed so that input images 52 and 54 and signal vectors 74 corresponding to the input images 52 and 54 may be associated with location information corresponding to the input images 52 and 54. Accordingly, it is possible to acquire an algorithm that learns the location information of the images 52 and 54 and signals 74.

Also, depending on the embodiment, information regarding an orientation of the movable object 1 at points p1 to p4 may be further applied as the output value of the second hidden layer 35. Thus, the orientation of the movable object 1 as well as a location corresponding to at least one of the input omnidirectional image 52 and panoramic image 54 may be learned by an algorithm 31.

Figure 12:
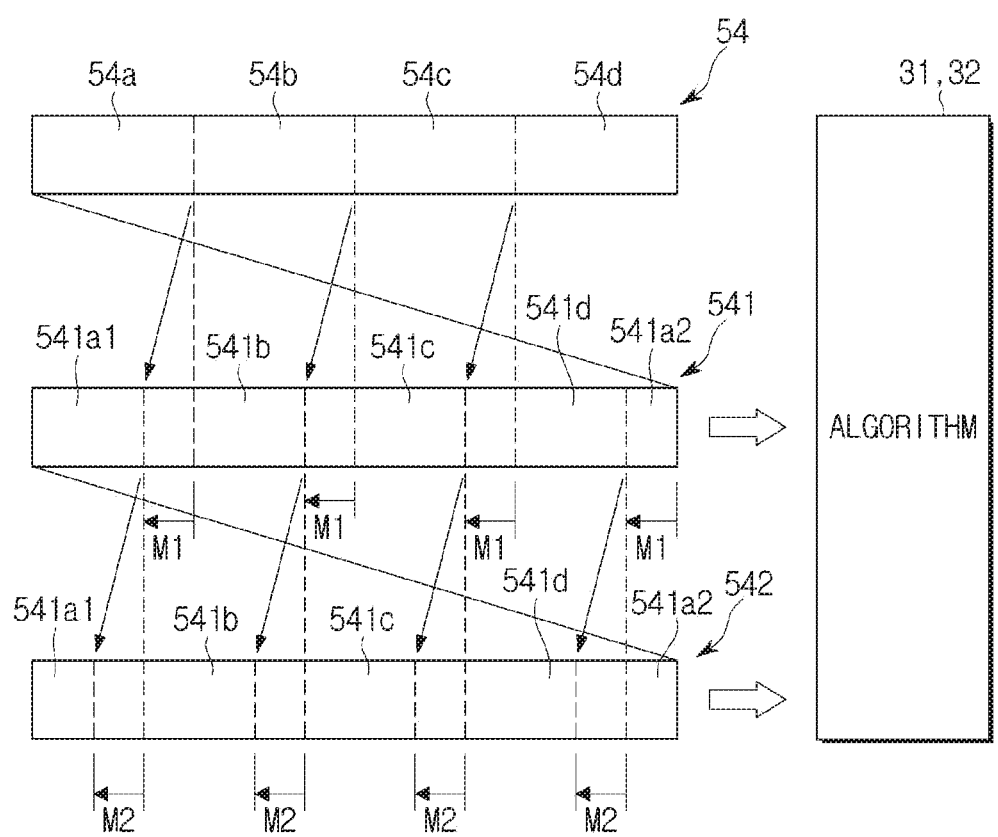
FIG. 12 illustrates a diagram of a shift of a panoramic image.

FIG. 12 illustrates a diagram of a shift of a panoramic image.

Referring to FIG. 12, according to an embodiment, a plurality of panoramic images 54, 541, and 542 may be input to the deep neural network algorithm 33. The plurality of panoramic images 54, 541, and 542 may be sequentially input to the algorithm 31, and the algorithm 31 may be learned by the plurality of panoramic images 54, 541, and 542.

In this case, at least one of the plurality of panoramic images 541 and 542 may be acquired by shifting the panoramic image 54 acquired by the controller 10 by a certain distance m1 or m2.

In other words, as shown in FIG. 5, when the panoramic image 54 based on the omnidirectional image 52 is acquired, the acquired panoramic image 54 is applied to the algorithm 31.

Subsequently, the controller 10 may shift the panoramic image 54 in a length direction by a predetermined distance m1 and may acquire a first shifted panoramic image 541 by moving the entirety or a portion of a section adjacent to one end of the panoramic image 54 to the other end 541a2 by a first distance m1. Here, the first distance m1 may be determined by a user, a designer, or the controller 10. In the first shifted panoramic image 541, the sections 54b, 54c, and 54d of the panoramic image 54 have been moved by the first distance m1 in a direction toward one end thereof to become sections 541b, 541c, and 541d of panoramic image 541.

The first shifted panoramic image 541 may be applied to the algorithm 31 and/or the learned algorithm 32.

Also, the controller 10 may acquire a second shifted panoramic image 542 by moving the first shifted panoramic image 541 by a second distance m2 in the same direction in which the image 54 was shifted when the first panoramic image 541 was acquired. Here, the second distance m2 may be determined by a user, a designer, or the controller 10. The second distance m2 may be defined as being equal to or different from the first distance m1.

Thus, the entirety or a portion of the section 541 a 1 located at one end of the first shifted panoramic image 541 appears in the second shifted panoramic image 542 at the other end (see 541a2), and the sections 541b, 541c, and 541d of the first shifted panoramic image 541 appear in the second shifted panoramic image 542 after being shifted by the second distance m2 (see 541a2, 542b, 542c, and 542d).

The second shifted panoramic image 542 may be applied to the algorithm 31 and/or the learned algorithm 32.

FIG. 12 illustrates an example in which the panoramic images 54, 541, and 542 are shifted two times. However, the panoramic images 54, 541, and 542 may be shifted three times. The controller 10 may acquire a number of panoramic images corresponding to the number of times the shift is performed. In this case, for example, the number of panoramic images acquired may be given as the number of times the shift is performed plus 1 (the total number of panoramic images=the number of shifts+1). As described above, three or more panoramic images may be sequentially applied to the algorithm 31 or the learned algorithm 32. The algorithm 31 may be learned by three or more panoramic images. Also, the learned algorithm 32 may be further learned by three or more panoramic images.

An embodiment in which the generation of the map 20 and the learning of the algorithm 31 are performed by the controller 10 has been described above. However, the generation of the map 20 and the learning of the algorithm 31 are not performed by only the controller 10 of the movable object 1. For example, at least one of the generation of the map 20 and the learning of the algorithm 31 may be performed by at least one of separate computing devices and other movable objects instead of the movable object 1. In this case, the communicator 70 may receive at least one of the generated map 20 and the learned algorithm 32 from at least one of computing devices and other movable objects, and the controller 10 may learn the algorithm 31 on the basis of the received map 20 and/or may perform a locating operation on the basis of the learned algorithm 32.

An embodiment of a process in which the movable object 1 determines its own location by using the learned algorithm 32 will be described below.

Figure 13:
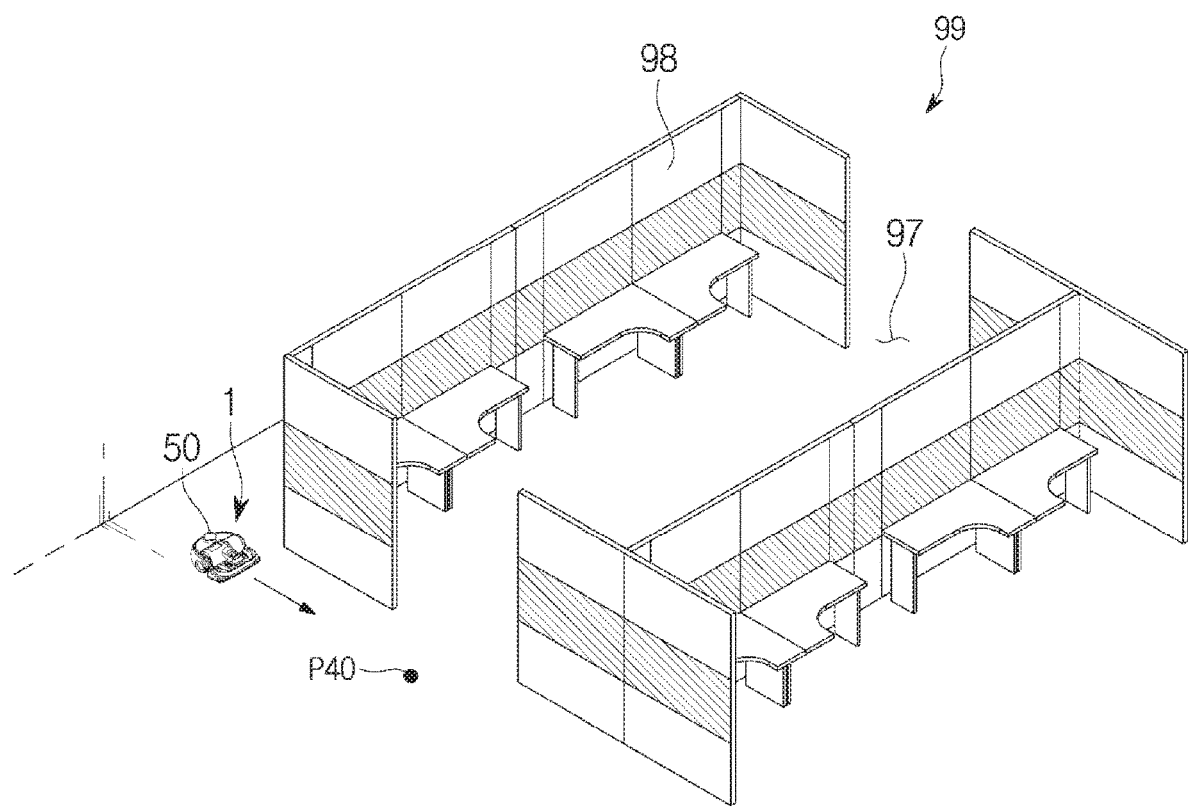
FIG. 13 illustrates a view of an example of a space in which a movable object is traveling.

FIG. 13 illustrates a view of an example of a space in which a movable object is traveling.

After the learned algorithm 32 associated with the traveling space 99 is acquired and stored in the storage 30, the movable object 1 travels in the traveling space 99 according to a user's adjustment or predefined settings.

The movable object 1 initiates a location determination at a predetermined location p40 (hereinafter referred to as a location determination point) according to a user's adjustment, settings predefined by a user or a designer, or an arbitrary determination of the controller 10.

Figure 14:
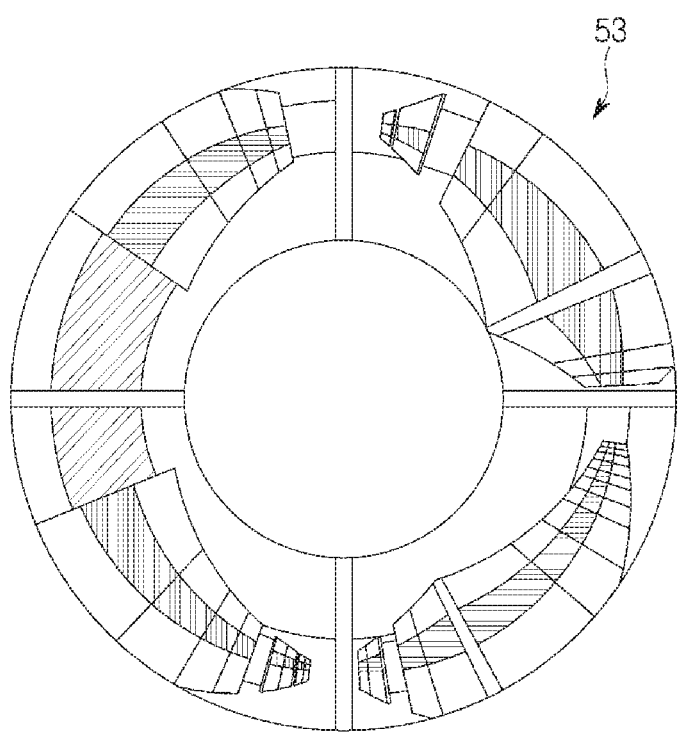
FIG. 14 illustrates a diagram of an example of an omnidirectional image acquired to locate a movable object.
Figure 15:
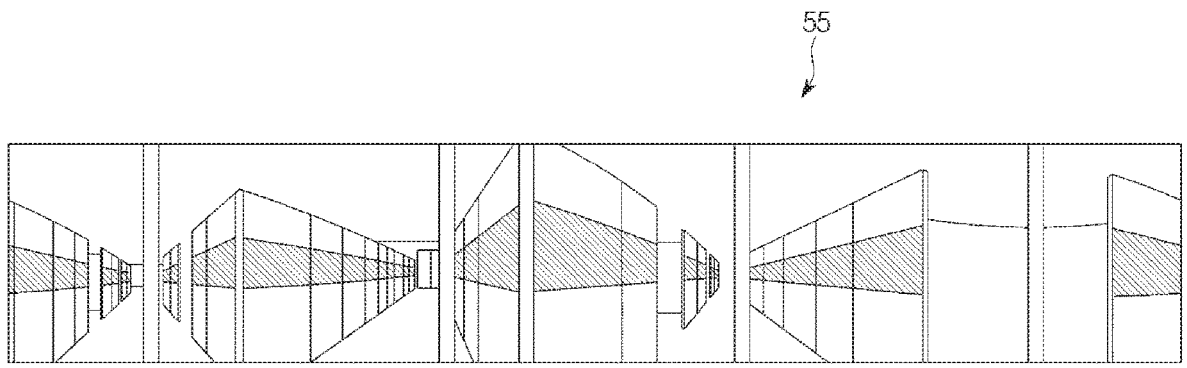
FIG. 15 illustrates a diagram of an example of a panoramic image corresponding to an acquired omnidirectional image.

FIG. 14 illustrates a diagram of an example of an omnidirectional image acquired to locate a movable object, and FIG. 15 illustrates a diagram of an example of a panoramic image corresponding to an acquired omnidirectional image.

The image acquirer 50 of the movable object 1 acquires images of the surroundings of movable object 1 at the location determination point p40 in response to the initiation of the location determination. The image acquirer 50 may be an omnidirectional camera. In this case, the acquired image may be an omnidirectional image 53.

Depending on the embodiment, as described above, the controller 10 of the movable object 1 may convert the omnidirectional image 53 into a panoramic image 55. For example, when the algorithm 31 is learned on the basis of a panoramic image 54, the controller 10 converts the omnidirectional image 53 into the panoramic image 55 to acquire the panoramic image 55 corresponding to the location determination point p40. When the algorithm 31 is learned on the basis of the omnidirectional image 52, the controller 10 may not convert the omnidirectional image 53 into the panoramic image 55. In other words, the controller 10 may directly use the omnidirectional image 53 acquired at the location determination point p40 in order to locate the movable object 1.

FIG. 16 illustrates a diagram of an example of vectorization of an acquired signal.

Also, the communicator 70 may receive a signal 72 from a signal transceiver 2, either simultaneously or in sequence with image acquisition of the image acquirer 50. The received signal 72 may be delivered to the controller 10.

Depending on the embodiment, as shown in FIG. 16, the controller 10 may generate a signal vector 74a on the basis of the received signal 72. As described above, the controller 10 may match at least one or more signal transceivers s1 to s11 to the strengths of signals corresponding to the at least one or more signal transceivers s1 to s11 to acquire a signal vector 74a corresponding to a location determination point p40.

When an omnidirectional image 53 or panoramic image 55 corresponding to the location determination point p40 is acquired and the signal vector 74a corresponding to the location determination point p40 is acquired, the controller 10 may input or apply the omnidirectional image 53 and the signal vector 74a to the learned algorithm 32 or may input or apply the panoramic image 55 and the signal vector 74a to the learned algorithm 32.

When the signal vector 74a and any one of the omnidirectional image 53 and the panoramic image 55 are input, the learned algorithm 32 may output any one of the omnidirectional image 53 and the panoramic image 55 depending on a result of the learning and also may output location information corresponding to the signal vector 74a, for example location coordinates.

Thus, the controller 10 may acquire any one of the omnidirectional image 53 and the panoramic image 55 and location information corresponding to the signal vector 74a and determine that the movable object 1 is present at a point p40 corresponding to the acquired location information. Accordingly, the controller 10 may recognize and determine the location of the movable object 1.

The controller 10 may input a satellite signal 77 received by the satellite signal receiver 75 to the learned algorithm instead of the signal 72 received by the communicator 70. The controller 10 may the satellite signal 77 into a signal vector and then input the signal vector for the satellite signal 77 to the learned algorithm 32.

Also, depending on the embodiment, the controller 10 may input both of the signal 72 received by the communicator 70 and the satellite signal 77 received by the satellite signal receiver 75 to the learned algorithm. In this case before the signal 72 and the satellite signal 77 are input to the learned algorithm 32, the controller 10 may convert both the received signal 72 and the received satellite signal 77 into signal vectors.

When the location of the movable object 1 is determined, the controller 10 may perform various operations and/or processes corresponding to the determined location p40.

For example, the controller 10 may determine whether the movable object 1 is present on a preset route on the basis of the determined location p40. When the movable object 1 is not present on the preset route, the controller 10 may determine whether there is a need to reset the route and may reset the route toward the destination point. Subsequently, the controller 10 may generate a control signal for each component, for example the driver 90, so that the movable object 1 may move along the reset route, and then deliver the generated control signal to a corresponding component.

Also, when the movable object 1 needs to be charged, the controller determine a route from a current location to a charging location on the basis of information about the determined location p40 and the charging location. The controller 10 may control the driver 90 so that the movable object 1 may move on the basis of the determined route from the current location to the charging location.

Also, the controller 10 may stop moving the movable object 1 or rotate the movable object 1 depending on the determined location p40 or may determine whether to unload an item loaded on the movable object 1 depending on the determined location p40.

In addition, as set by a user, a designer, or the controller 10, the controller 10 may generate various control signals associated with the operation of the movable object 1, and the movable object 1 may perform a designated operation under the control of the controller 10.

Figure 17:
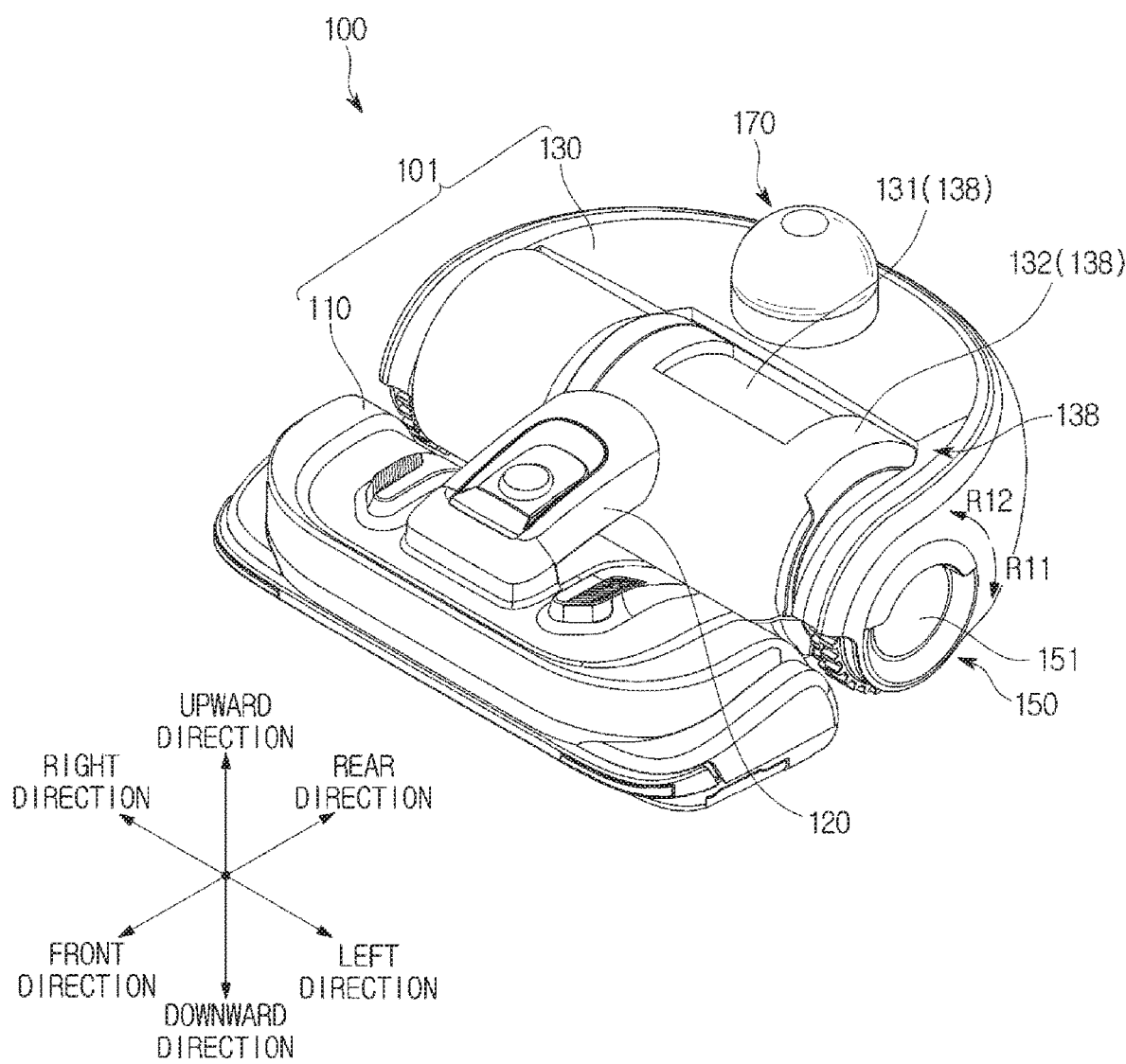
FIG. 17 illustrates a perspective view of an embodiment of a cleaning robot.
Figure 18:
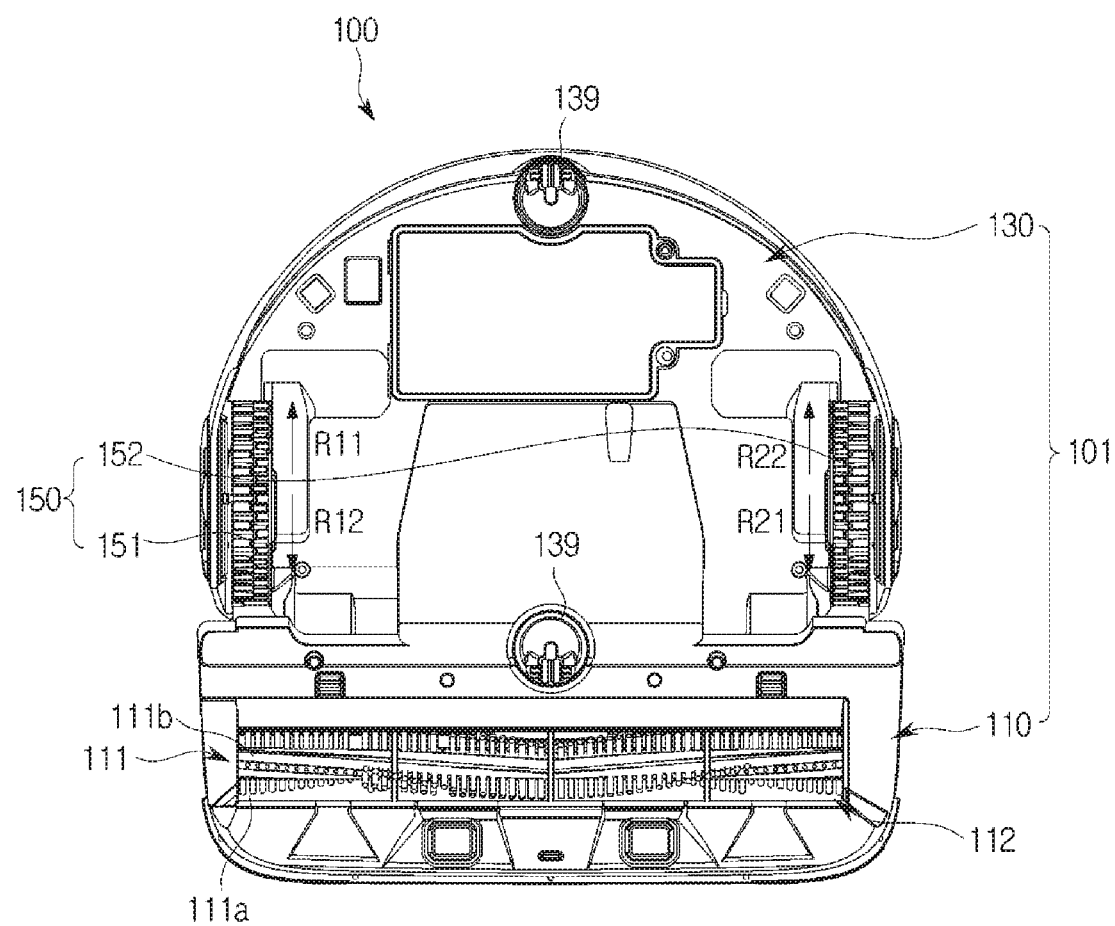
FIG. 18 illustrates a bottom view of an embodiment of a cleaning robot.
Figure 19:
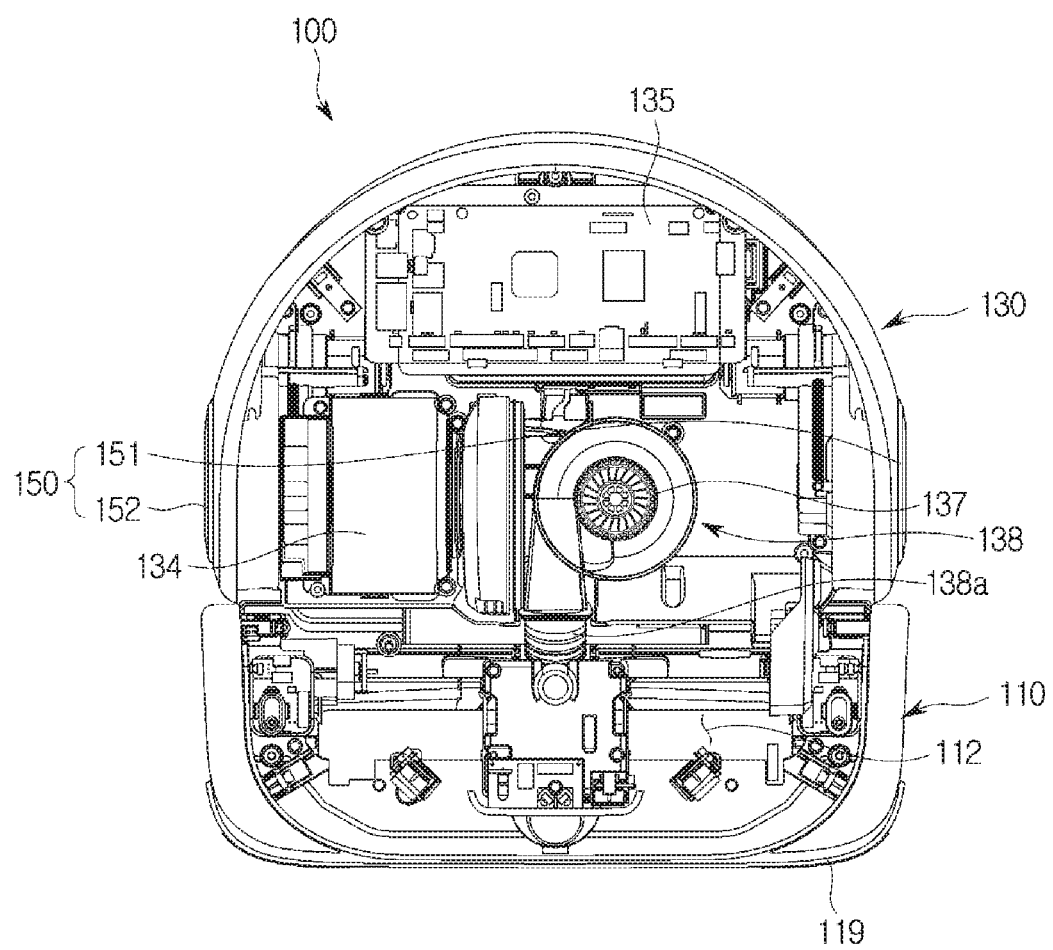
FIG. 19 illustrates a plan view of an internal structure of an embodiment of a cleaning robot.
Figure 20:
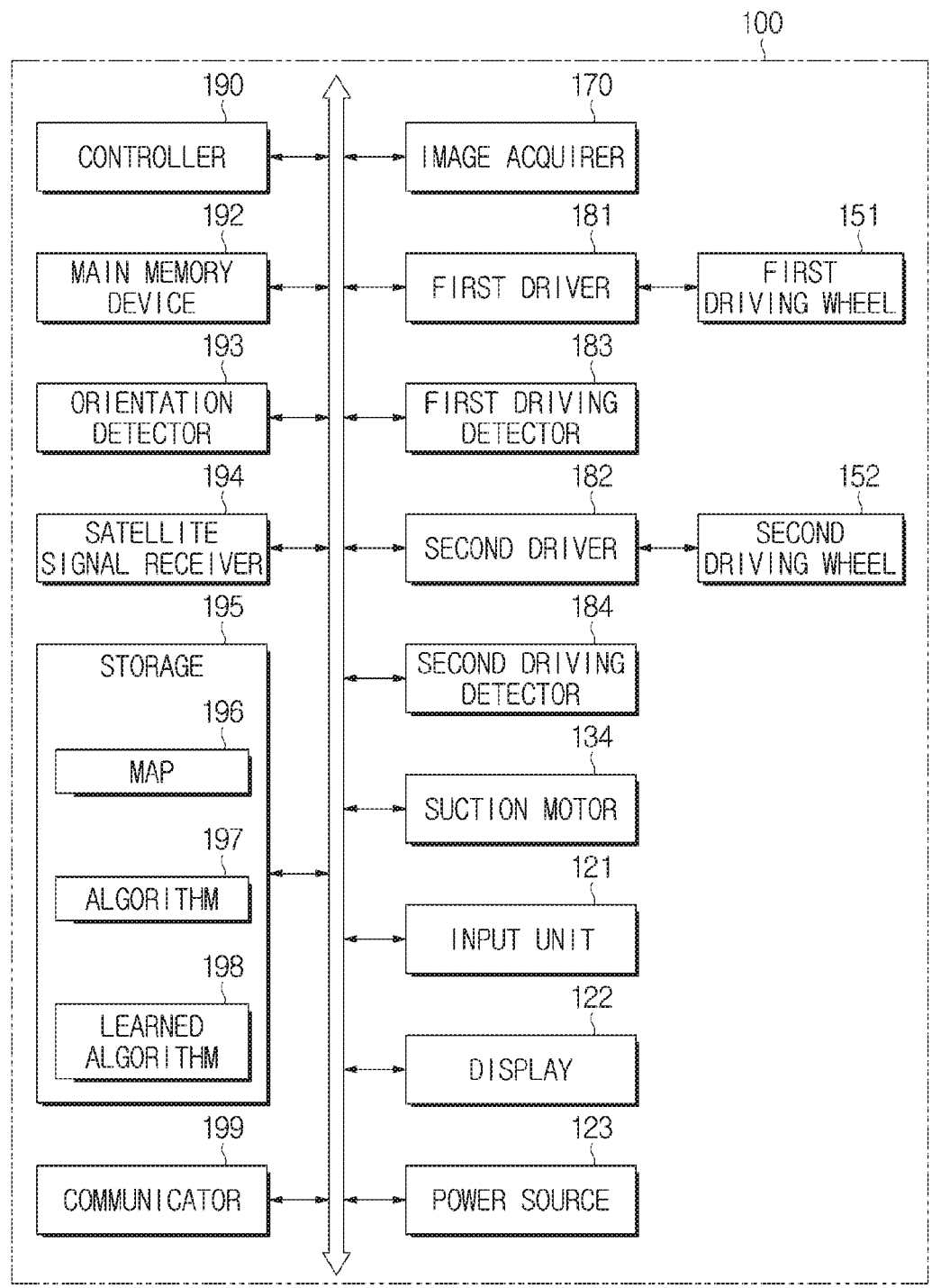
FIG. 20 illustrates a block diagram of an embodiment of a cleaning robot.

FIG. 17 illustrates a perspective view of an embodiment of a cleaning robot, FIG. 18 illustrates a bottom view of an embodiment of a cleaning robot, and FIG. 19 illustrates a plan view of an internal structure of an embodiment of a cleaning robot. FIG. 20 illustrates a block diagram of an embodiment of a cleaning robot. In FIG. 18, a state in which a dust collection chamber 132 is separated from a cleaning robot 100 of FIG. 14 is shown.

When the cleaning robot 100 is described, a direction in which suction devices are formed with respect to the center of the cleaning robot 100 is defined as a front direction, and a direction opposite to the front direction is defined as a rear direction. Also, when the cleaning robot 100 typically operates, a direction toward the ground is defined as a downward direction, and a direction opposite the downward direction is defined as an upward direction. Also, a direction of a segment perpendicular to a segment between the front direction and the rear direction is defined as a lateral direction. The lateral direction may include a left direction and a right direction opposite to the left direction.

As shown in FIGS. 17 to 19, the cleaning robot 100 may include a main body 101 forming an external appearance thereof, and the main body 101 may include a first main body 110 formed at a front side of the cleaning robot 100 and a second main body 130 formed behind the first main body 110.

The first main body 110 and the second main body 130 may be produced as one body or may be separately produced and then combined. When the first main body 110 and the second main body 130 are separately produced and then combined, a connection member fiber 120 for connecting the first main body 110 and the second main body 130 may be formed between the first main body 110 and the second main body 130.

According to an embodiment, various components for collecting various kinds of information associated with the traveling of the cleaning robot 100 or for suctioning dust from a floor surface may be provided in the first main body 110.

For example, a suction hole 112 for suctioning dust may be included on a bottom surface of the first main body 110. The dust suctioned through the suction hole 112 flows to an internal space of a dust collector 138 through at least one pipe body 138a provided inside the first main body 110, the connection member 120, and/or the second main body 130. The suction hole 112 may extend from a left direction of the first main body 110 to a right direction of the first main body 110.

A brush module 111 having an outer surface on which a plurality of protrusions are formed so that dust may be collected from a bottom floor may be provided in the suction hole 112 for suctioning dust. The brush module 111 may include a pivotable member 111b configured to pivot on a designated axis and at least one protrusion 111a formed on an outer circumference surface of the pivotable member 111b in a designated pattern. The pivotable member 111b may be formed in a lengthwise direction of the suction hole 112 formed on the bottom surface of the first main body 110. The protrusion 111a may sweep dust on a floor surface according to the rotation of the pivotable member 111b. The protrusion 111a may be implemented using a rigid material and/or a flexible material.

The brush module 111 may move the dust of the floor surface in at least one of the rear direction and the upward direction according to the rotation of the pivotable member 111b so that the dust of the floor surface enters the suction hole 112.

According to an embodiment, a means for storing the collected dust or controlling various kinds of operations associated with the cleaning robot 100 may be provided in the second main body 130.

A driving wheel 150 for moving the main body may be provided in the second main body 130. The driving wheel 150 may include a first driving wheel 151 and a second driving wheel 152. For example, the first driving wheel 151 and the second driving wheel 152 may be installed opposite to each other on both sides of the second main body 130.

The driving wheels 151 and 152 may be pivotably joined to both sides of the second main body 130 in designated directions R11, R12, R21, and R22. For example, the first driving wheel 151 may be installed in a left direction of the second main body 130, and the second driving wheel 152 may be installed in a right direction of the second main body 130.

The first driving wheel 151 and the second driving wheel 152 may rotate in the same direction or in opposite directions. Depending on the rotation directions R11, R12, R21, and R22 of the first driving wheel 151 and the second driving wheel 152, the cleaning robot 100 may perform operations such as a forward movement, a backward movement, a rotating movement, a circling movement, or a turning movement.

Also, as shown in FIG. 20, the cleaning robot 100 may include a first driver 181 configured to generate a driving force for the first driving wheel 151 and a second driver 182 configured to generate a driving force for the second driving wheel 152. Each of the first driver 181 and the second driver 182 may be implemented using a motor or an actuator. Here, the motor may include various kinds of motors that are typically used to rotate the wheels 151 and 152, such as a direct current (DC) motor, an alternating current (AC) motor, a DC brushless motor, or an AC brushless motor.

Also, the cleaning robot 100 may further include a first driving detector 183 and a second driving detector 184. The first driving detector 183 and the second driving detector 184 may detect operations of the first driving wheel 151 and the second driving wheel 152, respectively, and deliver results of the detection to a controller 190. The controller 190 may allow the cleaning robot 100 to appropriately travel in any way by controlling the first driver 181 and the second driver 182 on the basis of the delivered detection results. The first driving detector 183 and the second driving detector 184 may be implemented using, for example, a rotary encoder or a potentiometer.

Also, at least one roller 139 for supporting the cleaning robot 100 and assisting the rotation or turning operation of the cleaning robot 100 may be installed on the bottom surface of the second main body 130. The roller 139 may be implemented using a spherical member capable of rotating 360 degrees.

At least one of an input unit 121 for receiving a designated command from a user, such as a button or a knob, and a display 122 for displaying a status of the cleaning robot 100 and providing various kinds of information for a user may be further provided on the top surface of the second main body 130. The input unit 121 or the display 122 may not be provided depending on the embodiment.

An image acquirer 170 may be fixedly installed on a housing of the cleaning robot 100.

The image acquirer 170 may acquire an image on at least one of the front direction, the lateral direction, and the rear direction of the cleaning robot 100.

The image acquirer 170 may be implemented using, for example, an omnidirectional camera. When an omnidirectional camera is used, the image acquirer 170 may be installed and exposed from the top of the second main body 130 so that the image acquirer 170 captures images in 360 degrees, as shown in FIG. 17. Also, depending on the embodiment, the image acquirer 170 implemented using an omnidirectional camera may be installed in the top of the first main body 110 or may be installed in the top of the connection member 120 for connecting the first main body 110 and the second main body 130.

The image acquirer 170 may be implemented using a camera, an infrared camera, or the like. In this case, the image acquirer 170 may be installed on top of the second main body 130 as shown in FIG. 17 and may be installed on top of the first main body 110 or the connection member 120. When a camera or an infrared camera is used, the image acquirer 170 may be installed on an outer surface of the first main body 110, the connection member 120, or the second main body 130 in a designated direction, for example, in the front direction or the rear direction.

The image acquirer 170 may be electrically connected with a substrate 135 installed inside the second main body 130, through wires or circuits.

As shown in FIG. 18, a substrate 135 for performing various electronic controls on the cleaning robot 100 may be installed inside the second main body 130.

Various kinds of components associated with operational control for the cleaning robot 100 may be installed in the substrate 135. For example, at least one semiconductor chip, circuit, antenna, and/or associated component for performing the function of the controller 190, a main memory device 192, an orientation detector 193, a satellite signal receiver 194, a storage 195, or a communicator 199 may be installed in the substrate 135.

A dust collector 138 configured to suction and store dust may be included inside the second main body 130. The dust collector 138 may include a suction motor 134 configured to provide power for suctioning dust, an air blowing fan 137 operated by the suction motor 134, and a dust collection chamber 132 configured to accumulate the suctioned dust.

As shown in FIG. 17, the dust collection chamber 132 may be at least partially exposed on the second main body 130. The dust collection chamber 132 may be separated from the second main body 130 by a user. In this case, for the user's convenience, the dust collection chamber 132 may have a holding part 131 in a designated shape. A housing of the dust collection chamber 132 may be implemented using a transparent material, for example glass or synthetic resin. This allows a user to visually check on dust accumulated in the dust collection chamber 132.

The air blowing fan 137 generates an air flow to enable external dust to be suctioned and then moved into the dust collection chamber 132. The air blowing fan 137 may obtain a driving force from the suction motor 134.

The suction motor 134 provides power to the air blowing fan 137. The suction motor 134 may be implemented by employing, for example, a DC motor, an AC motor, a DC brushless motor, a linear induction motor, or the like. The suction motor 134 may start operating under the control of the controller 190. When the suction motor 134 operates, the air blowing fan 137 rotates in at least one direction, and thus the cleaning robot 100 may collect dust from a floor surface.

The controller 190 controls the overall operation of the cleaning robot 100.

According to an embodiment, as described above, the controller 190 may generate a map 196 by using an image acquired by the image acquirer 170 and a signal received by the communicator 199.

In this case, when the image acquired by the image acquirer 170 is an omnidirectional image, the controller 190 may convert the omnidirectional image into a panoramic image. A process of converting the omnidirectional image into a panoramic image may be performed before or after the map 196 is generated.

Also, according to the settings, the controller 190 may convert different signals received from a plurality of signal transceivers into signal vectors.

Also, the controller 190 groups a plurality of signals or a plurality of signal vectors to generate a plurality of groups, generates a sub-map corresponding to each of the groups, and combines the sub-maps to generate a map 196.

According to an embodiment, the controller 190 may store the generated map 196 in an algorithm 197 to acquire a learned algorithm 198.

In detail, the controller 190 extracts at least one point from the map 196 and sequentially or simultaneously applies an image (an omnidirectional image or a panoramic image) and a signal (or a signal vector) corresponding to the at least one point to the algorithm 197 to enable the algorithm 197 to be learned. In this case, the controller 190 may apply images and signals of all points that are defined or set on the map 196 to the algorithm 197 to acquire the learned algorithm 198. Depending on the embodiment, when a panoramic image is input, the controller 190 may shift the panoramic image to acquire at least one shifted panoramic image and sequentially or simultaneously input the acquired panoramic image to the algorithm 197.

According to an embodiment, as described above, the generation of the map 196 and the learning of the algorithm 197 may be performed by the controller 190 of the cleaning robot 100. According to another embodiment, the generation of the map 196 and the learning of the algorithm 197 may be performed by a computing device provided separately from the cleaning robot 100 or by another cleaning robot.

Also, according to an embodiment, the controller 190 may determine a location of the cleaning robot 100 on the basis of the learned algorithm 198. In detail, the controller 190 may determine a location of the cleaning robot 100 by inputting an image acquired by the image acquirer 170 and a signal received by the communicator 199 (and/or a satellite signal received by the satellite signal receiver 194) to the learned algorithm 198 and acquiring a result output from the learned algorithm 198 in response to the application of the image and the signal, that is, location information corresponding to the input image and signal. The controller 190 may also determine an orientation of the cleaning robot 100 by inputting the image and signal to the learned algorithm 198.

In this case, the controller 190 may input an omnidirectional image acquired by the image acquirer 170 to the learned algorithm 198 or may convert the omnidirectional image into a panoramic image and then input the panoramic image to the learned algorithm 198. When a panoramic image is input, the controller 190 may shift the panoramic image and input the shifted panoramic image to the learned algorithm 198.

Also, the controller 190 may convert a signal received by the communicator 199 into a signal vector and input the signal vector to the learned algorithm 198.

The operation and function of the controller 190 have been described through the description of the controller 10 of the movable object 1, and thus its detailed description will be omitted.

The main memory device 192 may store various kinds of data for the operation of the controller 190 and assist the operationof the controller 190. The main memory device 192 may be implemented using a read only memory (ROM) or a random access memory (RAM).

While the controller 190 performs the operations of generating the map 196, learning the algorithm 197, and/or determining the location of the cleaning robot 100, the main memory device 192 may temporarily store the omnidirectional image, the panoramic image, the map 196, the algorithm 197, the learned algorithm 198, and the signal and/or signal vector received by the communicator 199 to enable the controller 190 to more quickly perform the above-described operations.

The orientation detector 193 detects an orientation of the cleaning robot 100. The orientation of the cleaning robot 100 may include at least one of slopes in all directions, a slope with in a lateral direction, and a degree of rotation of the cleaning robot 100.

The orientation detector 193 may be implemented using at least one of a semiconductor tilt sensor, an acceleration sensor, a gyro sensor, and a rotation angle sensor.

A signal detected by the orientation detector 193 as well as information regarding a location of the cleaning robot 100 may be applied as an output value when the algorithm 197 is learned.

The satellite signal receiver 194 may receive a satellite signal. The satellite signal receiver 194 may receive a satellite signal on the basis of various kinds of navigation system technologies. The satellite signal received by the satellite signal receiver 194 may be delivered to the controller 190. The controller 190 may use the satellite signal to generate the map 196, learn the algorithm 197, and determine a location of the cleaning robot 100 in addition to or instead of the signal received by the communicator 199.

The storage 195 may store various kinds of data or programs for the operation of the controller 190. The storage 195 may store, for example, the learned algorithm 198 and may further store at least one of the map 196 and the algorithm 197. The map 186, the algorithm 197, and the learned algorithm 198 have been described, and thus their detailed descriptions will be omitted.

The storage 195 may be implemented using a semiconductor storage device, a magnetic disk storage device, or a magnetic drum storage device.

The communicator 199 may receive electromagnetic waves from an external signal transceiver (not shown) to communicate with the signal transceiver. Here, the external signal transceiver may include a WiFi router and may include, a docking station in which a communication module is installed.

The communicator 199 may be implemented using various components such as at least one communication chip, antenna, and substrate. For example, the communicator 70 may communicate with the signal transceiver using at least one wireless communication standard such as WiFi, WiFi Direct, Zigbee, Bluetooth, BLE, NFC, or mobile communication.

The input unit 121 is provided so that the user may input various commands, and the display 122 is provided to visually provide various kinds of information to the user.

For example, the input unit 121 may receive at least one of a map of a section in the cleaning robot 100 will travel and an algorithm 197 to be used for learning. The input unit 121 may be implemented using various kinds of input terminals such as a physical button, a touch button, a touchscreen, a joystick, a trackball, and a Universal Serial Bus (USB) port.

The display 122 may display information regarding a map used to acquire virtual data or various kinds of information associated with the operation of the cleaning robot 100, such as whether to start the learning or whether to end the learning. The display 122 may be implemented using a predetermined display panel such as a liquid crystal display. Also, the display 122 may be implemented using a lighting device such as a light emitting diode (LED). When a touchscreen is used as the input unit 121, a separate display 122 may be omitted.

A power source 123 for supplying power for the operation of the cleaning robot 100 may be provided inside the second main body 130. According to an embodiment, the power source 123 may be disposed behind the dust collector 138. The power source 123 may include a battery, and the battery may be a rechargeable secondary battery. When the main body 101 is connected with a separate docking station, the battery is charged by commercial power supplied from the docking station.

The operation of the cleaning robot 100 will be described below in detail.

Figure 21:
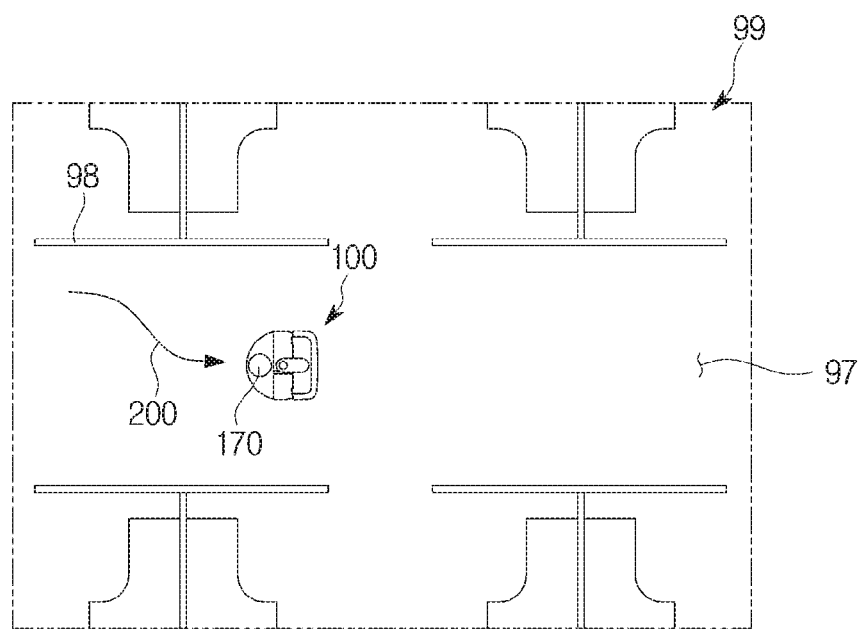
FIG. 21 illustrates a diagram of an example operation of a cleaning robot.
Figure 22:
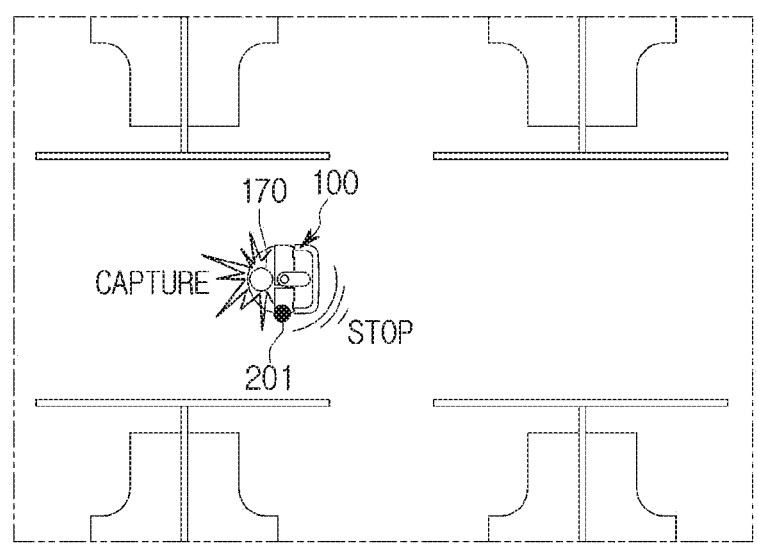
FIG. 22 illustrates a diagram of another example operation of a cleaning robot.
Figure 23:
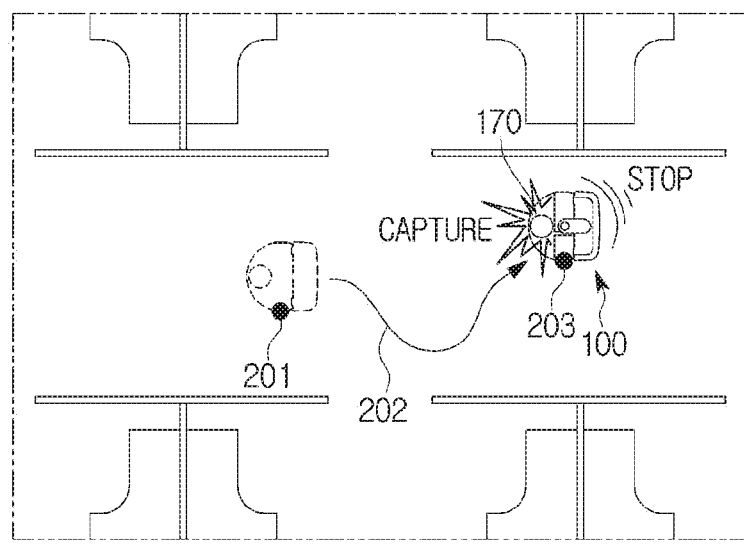
FIG. 23 illustrates a diagram of another example operation of a cleaning robot.
Figure 24:
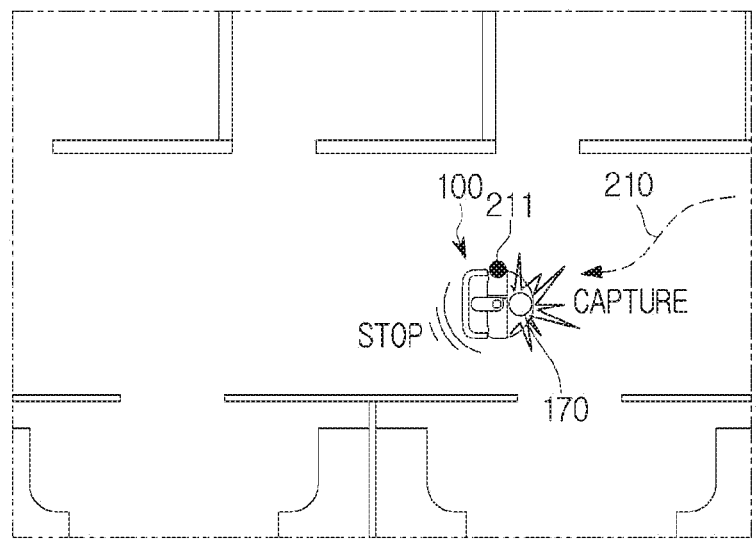
FIG. 24 illustrates a diagram of another example operation of a cleaning robot.

FIG. 21 illustrates a diagram of an example operation of a cleaning robot, and FIG. 22 illustrates a diagram of another example operation of a cleaning robot. FIG. 23 illustrates a diagram of another example operation of a cleaning robot, and FIG. 24 illustrates a diagram of yet another example operation of a cleaning robot.

As shown in FIG. 21, the cleaning robot 100 may move along a predetermined route 200 in a section 97 of a traveling space 99 through which the cleaning robot 100 may pass. In this case, the cleaning robot 100 may travel in a predefined traveling pattern or may travel according to a user's adjustment. Also, the cleaning robot 100 may travel according to the discretion of the controller 190.

When the cleaning robot 100 starts the operations of generating the map 196 and learning the algorithm 197, the cleaning robot 100 performs operations of capturing an image and recording a received signal at a predefined or an arbitrary first point 201.

According to an embodiment, when the cleaning robot 100 reaches the predefined or arbitrary first point 201, the cleaning robot 100 does not stop moving and may capture an image by means of the image acquirer 170.

According to another embodiment, as shown in FIG. 22, the cleaning robot 100 stops at the predefined or arbitrary first point 201 and may acquire images of the surroundings of cleaning robot 100 in all directions by means of the image acquirer 170. Various kinds of structures constituting a target, for example a section 98 through which the cleaning robot cannot pass may appear in the images captured by the cleaning robot 100.

Each of the acquired images may be an omnidirectional image.

The controller 190 of the cleaning robot 100 records the strength of a signal delivered from at least one signal transceiver at the same time as, before, or after the acquisition of the images of surroundings.

When the operations of capturing an image and recording a received signal at the first point 201 end, as shown in FIG. 23, the cleaning robot may start to travel in the traveling space 99 along the predetermined route 202, When the cleaning robot 100 stops traveling at the first point 201, the cleaning robot 100 may rotate the driving wheels 151 and 152 to resume traveling.

When the cleaning robot 100 reaches a predefined or arbitrarily selected second point 203, the cleaning robot 100 may repeatedly perform the operations of capturing an image and recording a received signal. Thus, other images of surroundings and signals associated with the cleaning robot 100 are acquired and stored.

Also, the cleaning robot 100 may repeat the above-described operations to acquire images and signals at a plurality of points.

According to the settings, within a certain period after an omnidirectional image or a signal is acquired, before the cleaning robot 100 resumes the moving operation 202, and/or while the cleaning robot 100 performs the moving operation 202, the cleaning robot 100 may convert the omnidirectional image into a panoramic image or convert the signal delivered from at least one signal transceiver into a signal vector. Also, at least one of the acquisition of a panoramic image and acquisition of a signal vector may be performed after the cleaning robot 100 sufficiently acquires a plurality of omnidirectional images and signals corresponding to a plurality of points.

Subsequently, the movable object 1 may generate a map 196 using the image and the signal and may acquire a learned algorithm 198 by applying the generated map 196 to an algorithm 197. The generation of the map 196 and the learning of the algorithm 197 may be performed while the cleaning robot 100 moves along predetermined routes 200 and 202 or whenever the image and the signal are acquired at each point 201 and 203. Also, the generation of the map 196 and the learning of the algorithm 197 may be performed after the cleaning robot 100 sufficiently acquires a plurality of omnidirectional images and signals corresponding to a plurality of points.

After the learned algorithm 198 is acquired and stored, there may be a need for the cleaning robot 100 to determine the location of the cleaning robot 100. In this case, the cleaning robot 100 acquires an image of its surroundings and also records a signal delivered from a signal transceiver after stopping at a predetermined point 211 or while the cleaning robot 100 travels along the route 210.

Subsequently, the cleaning robot 100 inputs the acquired image and signal to the learned algorithm 198 to obtain an output value for location information. Thus, the cleaning robot 100 may acquire information regarding a current location of the cleaning robot 100. Before the acquired image and signal is input to the learned algorithm 198, the cleaning robot 100 may convert an acquired omnidirectional image into a panoramic image, generate a signal vector on the basis of a signal transmitted by at least one signal transceiver, and apply the generated panoramic image and signal vector to the learned algorithm 198.

In this way, it is possible to appropriately recognize a current position of the cleaning robot 100 despite changes in environmental factors in the traveling space 99, for example a change in illumination or the like, by means of the cleaning robot 100 learning the algorithm 197 on the basis of the omnidirectional image and the received signal, acquiring the learned algorithm 198, and estimating or determining the location on the basis of the acquired learned algorithm 198.

An embodiment of the movable object control method will be described below with reference to FIGS. 25 and 26.

Figure 25:
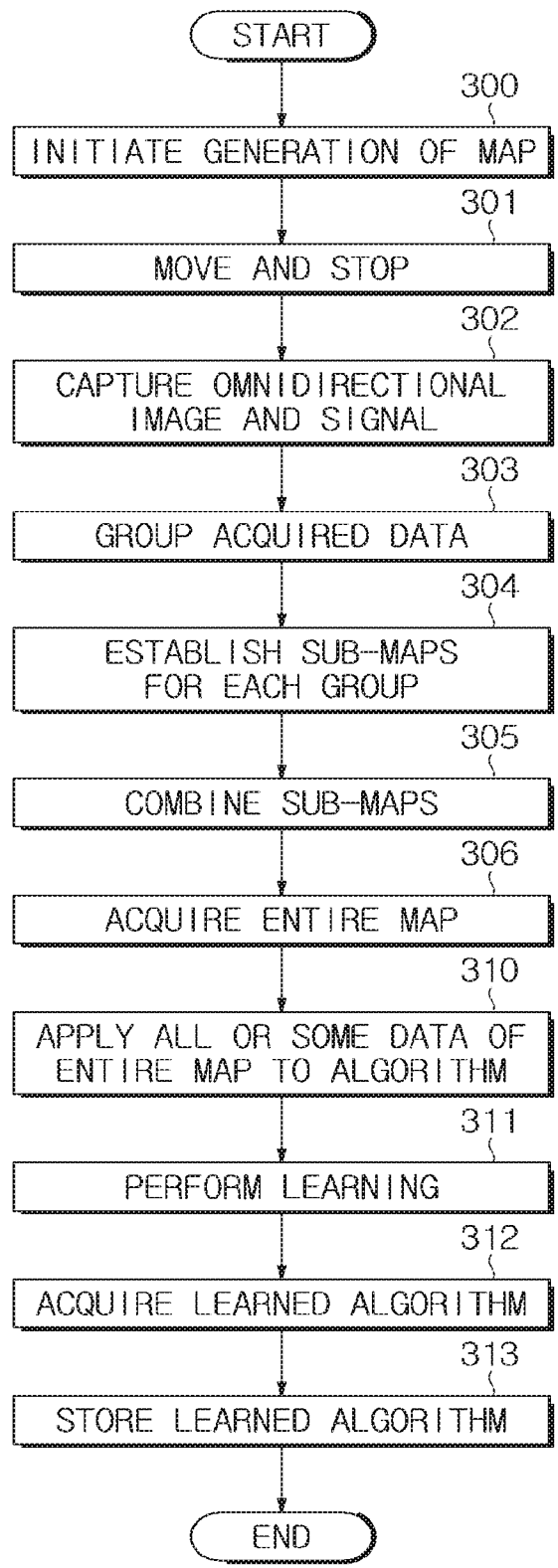
FIG. 25 illustrates a flowchart of an embodiment of a movable object control method.

FIG. 25 illustrates a flowchart of an embodiment of the movable object control method.

As shown in FIG. 25, a movable object initiates a map generation operation according to a predefinition or according to a command input by a user or a designer (300).

The movable object may move toward at least one or more points and stop at each point depending on the embodiment (301).

The movable object may acquire an omnidirectional image and a signal at each point (302). The omnidirectional image may be acquired using an omnidirectional camera or may be acquired using a camera or an infrared camera while the movable object is rotated at each point. The acquired signal may include at least one of a signal delivered by a signal transceiver and a satellite signal delivered by a satellite.

The signal delivered by the signal transceiver may have strength changing depending on the location of the movable object. In more detail, the acquired signal strength may change according to a distance between the movable object and the signal transceiver. The signal delivered by the signal transceiver may include, for example, at least one of a WiFi signal, a WiFi Direct signal, a Zigbee signal, a Bluetooth signal, a BLE signal, and a NFC signal.

Depending on the embodiment, the movable object may further include information regarding an orientation of the movable object at each point by means of an orientation detector such as a gyro sensor.

The movable object may convert the omnidirectional image into a panoramic image. Also, the movable object may vectorize a received signal. In detail, for example, the movable object may vectorize the received signal by combining signals transmitted by a plurality of signal transceivers to generate a signal vector.

According to an embodiment, the movable object may group at least one omnidirectional image and at least one signal acquired at at least one point to acquire at least one group (303).

When at least one group is generated, the movable object may acquire at least one sub-map corresponding to the at least one group by using a designated 3D restoration method, for example, a method of acquiring a structure from motion (304). Here, the sub-map may be a 2D map or a 3D map.

When at least one sub-map is acquired, the movable object may combine the at least one sub-map (305) and thus may acquire the entire 2D or 3D map of a traveling space in which the movable object will move.

The movable object may apply all or some data constituting the entire map to a predetermined algorithm (310) and may learn an algorithm (311). Thus, the learned algorithm is acquired (312).

For example, the movable object may acquire the learned algorithm by applying the location of the movable object acquired through an image of the surroundings of the movable object included in the map, a received signal, and a 3D restoration method. In this case, the image of the surroundings of the movable object included in the map and the received signal are applied to the algorithm as input values, and the location of the movable object is applied to the algorithm as an output value. The location of the movable object may be extracted from the map acquired in step 306 or may be acquired using location information, for example coordinates extracted from the acquired map.

The movable object may apply a satellite signal to the algorithm as an input value, in addition to or instead of the received signal, to acquire the learned algorithm.

Also, depending on the embodiment, the movable object may further apply information regarding an orientation as well as the location of the movable object to the algorithm as an output value.

The algorithm to which all or some data is applied and the learned algorithm may be implemented by using a deep neural network, a convolutional neural network, a recurrent neural network, a deep belief network, and a deep Q-network, solely or in combination.

The learned algorithm is temporarily or non-temporarily stored in a storage provided in the movable object and is provided by a controller of the movable object when summoned by the controller. The controller may determine the location of the movable object by using the summoned learned algorithm.

Figure 26:
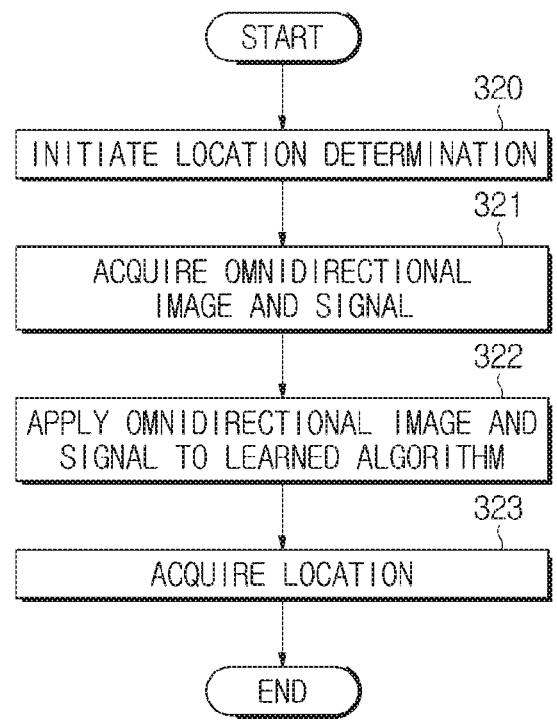
FIG. 26 illustrates a flowchart of an embodiment of a movable object control method.

FIG. 26 illustrates a flowchart of an embodiment of a movable object control method.

As shown in FIG. 26, an operation of determining a location of a movable object (320), the movable object may acquire an omnidirectional image and a signal in the vicinity of the movable object while traveling or after stopping at a point at which the location is to be determined. Here, the signal may be a signal transferred from a signal transceiver and/or a satellite signal delivered from a satellite.

The movable object may input the omnidirectional image and the signal to the learned algorithm acquired in step 312. In this case, the movable object may convert the omnidirectional image into a panoramic image and then input the panoramic image, instead of inputting the omnidirectional image.

When the omnidirectional image (or the panoramic image) and the signal are input to the learned algorithm, information regarding the location, for example coordinates of the movable object obtained from the learned algorithm, are output (323). Depending on the embodiment, information regarding an orientation of the movable object obtained from the learned algorithm may be further output.

The movable object control method that has been described with reference to FIGS. 25 and 26 may also be directly applied to or partially modified and then applied to the control method for the cleaning robot. In addition, the above-described movable object control method may be directly applied to or partially modified and then applied to control methods for vehicles, carts, various kinds of construction equipment, toy cars, medical devices, or various industrial, medical, or military robots.

The movable object control method according to the above-described embodiment may be implemented in the form of a program that is executable by various computing devices. Here, the program can include a program instruction, a data file, a data structure, etc. solely or in combination. The program may be designed and produced using not only a mechanical language code that is generated by a compiler, but also a high-level language code that is executable by a computer through an interpreter. The program may have been specially designed to implement the aforementioned movable object control method or may be implemented using various available functions or definitions known to those skilled in computer software.

The program for implementing the aforementioned movable object control method may be recorded on a computer-recordable recording medium. The computer-recordable recording medium may include various kinds of hardware devices capable of storing specific programs called and executed by a computer or the like, for example, a magnetic medium such as a hard disk or floppy disk, a magnetic tape, an optical medium such as a CD-ROM or DVD, a magneto-optical medium such as a floptical disk, and a semiconductor storage device such as a ROM, a RAM, or a flash memory.

As is apparent from the above description, according to the movable object and the movable object control method, it is possible to recognize a current location of the movable object despite changes in environmental factors and thus possible to appropriately and effectively control the movable object in any way.

According to the movable object and the movable object control method, it is advantageously possible for the movable object to accurately recognize a location of the movable object despite a change in various external factors.

Also, according to the movable object and the movable control method, it is possible for the movable object to recognize its location even when appropriate feature points cannot be extracted from a captured image because of the characteristics, i.e., a shape or material of a subject of the image or an environmental factor such as a change in illumination.

Several embodiments of the movable object and the movable object control method have been described, but the movable object and the movable object control method are not limited to the aforementioned embodiments. Various embodiments that may be implemented by those skilled in the art modifying the above-described embodiments may correspond to an embodiment of the above-described movable object and movable object control method. For example, the same or similar results as those of the above-described movable object and movable object control method may be achieved although the described techniques are performed in a different order and/or although components in a described system, architecture, device, or circuit are combined in a different manner and/or replaced or supplemented by other components or their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for movable object control, comprising:
acquiring at least one omnidirectional image of a surroundings of a movable object;
decomposing the at least one omnidirectional image of the surroundings of the movable object into a plurality of unit images;
acquiring at least one signal having strength changing depending on a location of the movable object;
grouping at least one of the plurality of unit images and the at least one signal into a plurality of groups;
acquiring a plurality of sub-maps for each of the plurality of groups;
identifying corresponding points between the plurality of sub-maps;
generating at least one map by combining the plurality of sub-maps using the corresponding points; and
applying the at least one map to an algorithm to acquire a learned algorithm,
wherein the algorithm uses at least one of a deep neural network (DNN), a convolutional neural network (CNN), a recurrent neural network (RNN), a deep belief network (DBN), or a deep Q-Network, and
wherein the sub-maps indicate a 3D map of a portion of a target.

2. The method of claim 1, further comprising converting the plurality of unit images into at least one panoramic image.

3. The method of claim 2, wherein applying the at least one map to the algorithm to acquire the learned algorithm includes applying the at least one panoramic image and the at least one signal to the algorithm to acquire the learned algorithm.

4. The method of claim 2, wherein applying the at least one map to the algorithm to acquire the learned algorithm includes:
shifting the at least one panoramic image; and
applying the shifted at least one panoramic image and the signal to the algorithm to acquire the learned algorithm.

5. The method of claim 1, wherein the learned algorithm is an algorithm for the location of the movable object corresponding to the signal and the at least one omnidirectional image of the surroundings of the movable object.

6. The method of claim 1, wherein applying the at least one map to the algorithm to acquire the learned algorithm includes:
acquiring the location of the movable object from the map; and
applying the signal, the omnidirectional image of the surroundings of the movable object included in the map, and the location of the movable object to the algorithm to acquire the learned algorithm.

7. The method of claim 6, further comprising acquiring information regarding an orientation of the movable object from the map.

8. The method of claim 1, further comprising vectorizing the signal.

9. A movable object comprising:
an image acquirer configured to acquire an omnidirectional image of a surroundings of the movable object;
a communicator configured to receive at least one external signal having a strength changing depending on a location of the movable object; and
a controller configured to:
decompose the omnidirectional image of the surroundings of the movable object into a plurality of unit images,
group at least one of the plurality of unit images and the at least one external signal into a plurality of groups,
acquire a plurality of sub-maps for each of the plurality of groups,
identify corresponding points between the plurality of sub-maps,
generate a map by combining the plurality of sub-maps using the corresponding points, and
apply the map to an algorithm to acquire a learned algorithm,
wherein the algorithm uses at least one of a deep neural network (DNN), a convolutional neural network (CNN), a recurrent neural network (RNN), a deep belief network (DBN), or a deep Q-Network, and
wherein the sub-maps indicate a 3D map of a portion of a target.

10. The movable object of claim 9, wherein the controller is further configured to convert the plurality of unit images into a panoramic image and apply the panoramic image to the algorithm.

11. The movable object of claim 10, wherein the controller is further configured to, while shifting the panoramic image at least one time, apply the shifted panoramic image to the algorithm.

12. The movable object of claim 9, further comprising an orientation detector configured to acquire information regarding an orientation of the movable object,
wherein the controller further applies the information regarding an orientation of the movable object to the algorithm to acquire the learned algorithm.

13. The movable object of claim 9, wherein when a location determination operation is initiated, the controller is further configured to apply the omnidirectional image of the surroundings of the movable object acquired by the image acquirer and the external signal received by the communicator to the learned algorithm to determine the location of the movable object.

14. The movable object of claim 9, further comprising a satellite signal receiver configured to receive a satellite signal,
wherein the controller further uses the satellite signal to generate the map or further applies the satellite signal to the algorithm to acquire the learned algorithm.

15. A cleaning robot comprising:
an image acquirer configured to acquire an omnidirectional image of a surroundings of a movable object;
a communicator configured to receive at least one external signal having strength changing depending on a location of the movable object; and
a controller configured to:
decompose the omnidirectional image of the surroundings of the movable object into a plurality of unit images,
group at least one of the plurality of unit images and the at least one external signal into a plurality of groups,
acquire a plurality of sub-maps for each of the plurality of groups,
identify corresponding points between the plurality of sub-maps,
generate a map by combining the plurality of sub-maps using the corresponding points, and
apply the map to an algorithm to acquire a learned algorithm,
wherein the algorithm uses at least one of a deep neural network (DNN), a convolutional neural network (CNN), a recurrent neural network (RNN), a deep belief network (DBN), or a deep Q-Network, and
wherein the sub-maps indicate a 3D map of a portion of a target.

* * * * *